(12) United States Patent
Park et al.

(10) Patent No.: US 10,728,888 B2
(45) Date of Patent: Jul. 28, 2020

(54) METHOD FOR ALLOCATING RESOURCES IN CELLULAR NETWORK USING UNLICENSED BAND AND DEVICE THEREFOR

(71) Applicant: Samsung Electronics Co., Ltd, Suwon-si (KR)

(72) Inventors: Seung-Hoon Park, Seoul (KR); Jung-Min Moon, Suwon-si (KR); Sun-Heui Ryoo, Yongin-si (KR); Byoung-Hoon Jung, Seoul (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/530,791

(22) Filed: Aug. 2, 2019

(65) Prior Publication Data
US 2019/0357190 A1   Nov. 21, 2019

Related U.S. Application Data

(63) Continuation of application No. 15/565,403, filed as application No. PCT/KR2016/003499 on Apr. 5, 2016, now Pat. No. 10,383,103.
(Continued)

(30) Foreign Application Priority Data

Mar. 31, 2016   (KR) .................. 10-2016-0039790

(51) Int. Cl.
*H04W 4/00*   (2018.01)
*H04W 72/04*   (2009.01)
(Continued)

(52) U.S. Cl.
CPC ........ *H04W 72/042* (2013.01); *H04L 5/0092* (2013.01); *H04L 27/0006* (2013.01);
(Continued)

(58) Field of Classification Search
None
See application file for complete search history.

(56) References Cited

U.S. PATENT DOCUMENTS

| 8,830,947 B2 | 9/2014 | Turtinen et al. |
| 2012/0176884 A1* | 7/2012 | Zhang ................. H04W 72/042 370/203 |

(Continued)

OTHER PUBLICATIONS

International Search Report dated Jul. 8, 2016 in connection with International Patent Application No. PCT/KR2016/003499, 2 pages.
(Continued)

*Primary Examiner* — Clemence S Han

(57) ABSTRACT

Disclosed is a 5G or pre-5G communication system provided so as to support a data transmission rate higher than that of a 4G communication system, such as LTE. A method and a device for transmitting information in a communication system are disclosed. The method for allocating resources in a cellular network using an unlicensed band comprises the steps of: generating at least one resource allocation signal containing information indicating a plurality of continuous uplink subframes capable of communicating through the unlicensed band; transmitting the resource allocation signal to a user equipment (UE) through the unlicensed band for the duration of at least one downlink subframe; and receiving uplink data from the UE for the duration of the continuous uplink subframes.

20 Claims, 28 Drawing Sheets

Related U.S. Application Data

(60) Provisional application No. 62/145,151, filed on Apr. 9, 2015.

(51) Int. Cl.

| | | |
|---|---|---|
| *H04W 72/14* | (2009.01) | |
| *H04L 5/00* | (2006.01) | |
| *H04L 27/00* | (2006.01) | |
| *H04W 16/14* | (2009.01) | |
| *H04W 74/08* | (2009.01) | |
| *H04W 72/12* | (2009.01) | |

(52) U.S. Cl.
CPC ....... *H04W 16/14* (2013.01); *H04W 72/0446* (2013.01); *H04W 72/14* (2013.01); *H04W 74/08* (2013.01); *H04W 72/1268* (2013.01)

(56) References Cited

U.S. PATENT DOCUMENTS

| | | | | |
|---|---|---|---|---|
| 2012/0257552 | A1* | 10/2012 | Chen | H04L 5/001 370/280 |
| 2013/0039297 | A1* | 2/2013 | Wang | H04W 76/25 370/329 |
| 2014/0036818 | A1 | 2/2014 | Koskela et al. | |
| 2015/0016376 | A1* | 1/2015 | Seo | H04L 5/0048 370/329 |
| 2015/0215097 | A1 | 7/2015 | Yi et al. | |
| 2015/0249517 | A1* | 9/2015 | Seo | H04W 72/042 370/329 |
| 2015/0365965 | A1* | 12/2015 | Wu | H04L 1/1812 370/328 |
| 2016/0095101 | A1* | 3/2016 | Ye | H04L 1/1854 370/329 |
| 2017/0079065 | A1* | 3/2017 | Lyu | H04W 72/1289 |
| 2017/0222764 | A1* | 8/2017 | Scherb | H04L 1/1861 |
| 2017/0223635 | A1 | 8/2017 | Dinan | |
| 2017/0223672 | A1 | 8/2017 | Dinan et al. | |
| 2017/0223673 | A1 | 8/2017 | Dinan et al. | |
| 2017/0223675 | A1 | 8/2017 | Dinan et al. | |
| 2017/0272200 | A1 | 9/2017 | Dinan | |
| 2017/0279583 | A1 | 9/2017 | Dinan | |
| 2017/0290040 | A1 | 10/2017 | Dinan | |

OTHER PUBLICATIONS

Samsung, "Discussion on UL transmission for LAA", 3GPP TSG RAN WG1 #79, Nov. 17-21, 2014, 4 pages, R1-144744.

Fujitsu, "Design of LAA UL transmission", 3GPP TSG RAN WG1 Meeting #80, Feb. 9-13, 2015, 3 pages, R1-150186.

Coolpad, "Consideration on the UL scheduling design for LAA", 3GPP TSG RAN WG1 Meeting #80, 3 pages, R1-150511. Feb. 9-13, 2015.

KDDI, "Consideration of UCI transmission for LAA", 3GPP TSG-RAN1 Meeting #80, Feb. 9-13, 2015, 2 pages, R1-150574.

* cited by examiner

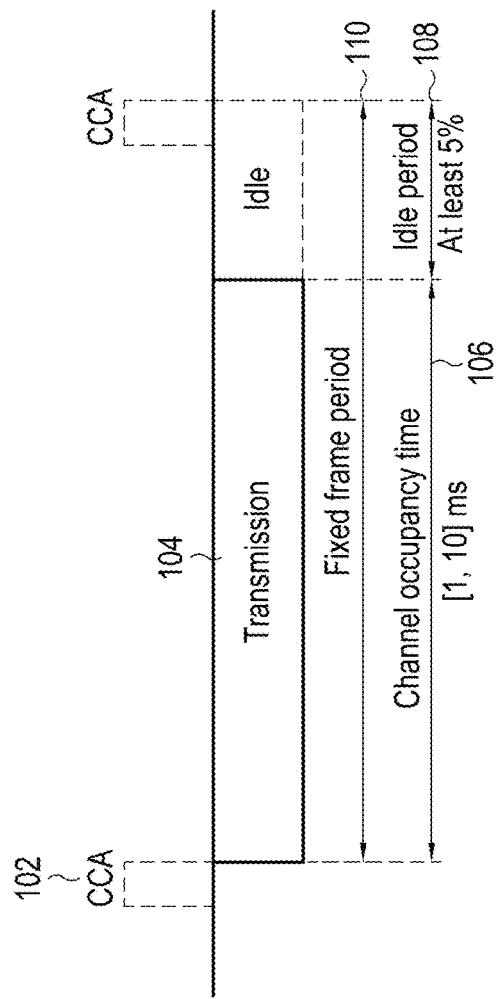
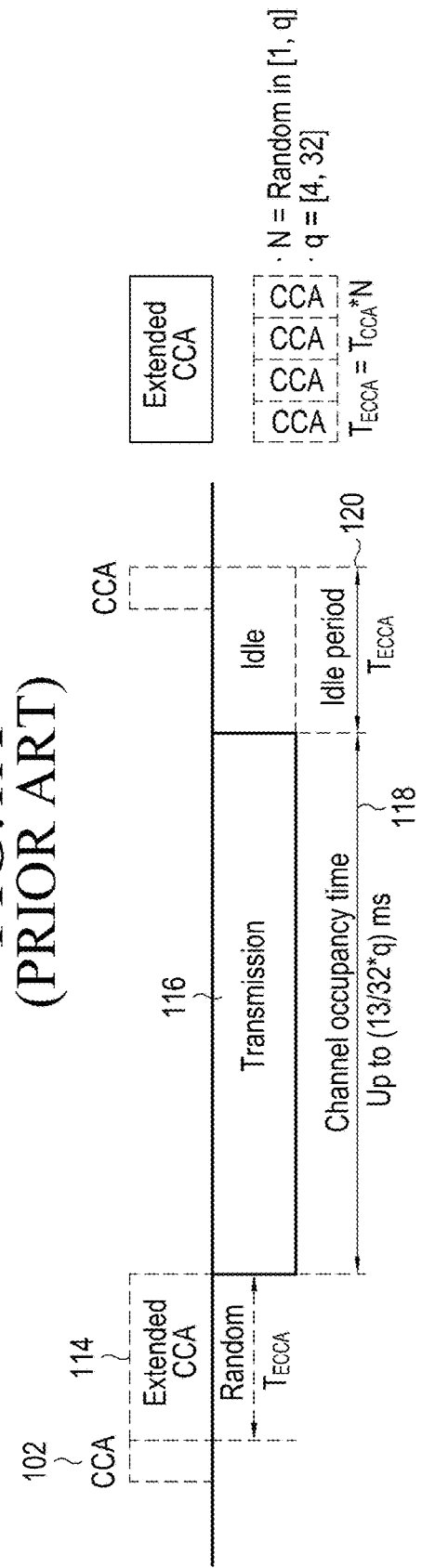

METHOD FOR ALLOCATING RESOURCES IN CELLULAR NETWORK USING UNLICENSED BAND AND DEVICE THEREFOR

CROSS-REFERENCE TO RELATED APPLICATIONS

The present application is a continuation of U.S. patent application Ser. No. 15/565,403 filed on Oct. 9, 2017, which is a 371 of International Patent Application No. PCT/KR2016/003499 filed on Apr. 5, 2016, which claims the benefit of U.S. Provisional Patent Application No. 62/145,151 filed on Apr. 9, 2015 and Korean Patent Application No. 10-2016-0039790 filed on Mar. 31, 2016, the disclosures of which are herein incorporated by reference in their entirety.

BACKGROUND

The present disclosure relates to a method and apparatus for allocating resources for an unlicensed band in a system sharing a resource for device-to-device communication.

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

To improve speed and capacity of an LTE network along with development of LTE, improved techniques such as LTE in Unlicensed Spectrum (LTE-U) using a shared band have been studied. LTE-U or Licensed-Assisted Access (LAA) means a technology for integrating a licensed spectrum or licensed band and an unlicensed spectrum or unlicensed band as well as a licensed band used for existing LTE communication, by using carrier aggregation (CA), and uses a stable licensed band as an anchor to process all control signals and signaling, thereby supporting a quality of service (QoS) and smooth mobility. Moreover, LTE-U or LAA secures a wide data pipe based on extension to an unlicensed band, thus providing users with improved mobile broadband experiences.

Since an unlicensed band is a shared band available to any technique or device, most countries have established regulations on the use of an unlicensed band. To reduce interference between devices in an unlicensed band, a transmission power of a device using an unlicensed band may be limited to a lower level than a licensed band.

Transmission regulations for a shared band like a license-exempt band or an unlicensed band provide various types of schemes to alleviate signal interference between devices, such as a scheme of limiting a transmission power to prevent a reception power in a specific distance from being greater than or equal to a particular value, a scheme of hopping a position on a time or frequency resource or allowing use of only some of total resources, a scheme of listening a signal from another device and allowing transmission when a reception power of the signal is less than a particular value, and so forth.

Existing cellular communication such as LTE requires a resource allocation procedure based on channel measurement and link adaptation to adaptively determine a transmission capacity of a transmission/reception link. However, in a shared band, such as an unlicensed band, for which rules for co-existence of different communication systems are established, several problems may occur in application of existing resource allocation schemes. As a result, a need has arisen for a new resource allocation scheme for communication using an unlicensed band.

SUMMARY

The present disclosure provides a method and apparatus for transmitting and receiving a signal in a communication system.

The present disclosure also provides a method and apparatus for controlling physical channel parameters of a communication link in a system sharing communication resources.

The present disclosure also provides a method and apparatus for allocating a resource for a cellular network sharing a resource in an unlicensed band.

The present disclosure also provides a method and apparatus for allocating a resource to solve problems of delay increase and signaling load increase due to a listen before talk (LBT) failure in an unlicensed band.

The present disclosure also provides a method and apparatus for minimizing a loss and efficiently using a frequency band for cellular communication in a shared band.

A method for allocating a resource in a cellular network using an unlicensed band according to an embodiment of the present disclosure includes generating at least one resource assignment signal including information indicating a plurality of consecutive uplink (UL) subframes communicable through the unlicensed band, transmitting the resource assignment signal to a user equipment (UE) through the unlicensed band during at least one downlink (DL) subframe, and receiving UL data from the UE during the consecutive UL subframes.

A method for receiving resource allocation in a cellular network using an unlicensed band according to an embodiment of the present disclosure includes receiving at least one resource assignment signal including information indicating a plurality of consecutive UL subframes communicable through the unlicensed band from an evolved NodeB (eNB) during at least one DL subframe, identifying the plurality of consecutive UL subframes based on the resource assignment signal and other control signals, and transmitting UL data to the eNB during the consecutive UL subframes.

An eNB for allocating a resource in a cellular network using an unlicensed band according to an embodiment of the present disclosure includes a controller configured to generate at least one resource assignment signal including information indicating a plurality of consecutive UL subframes communicable through the unlicensed band and a transceiver configured to transmit the resource assignment signal to a UE during at least one DL subframe and to receive UL data from the UE during the plurality of consecutive UL subframes.

A UE for receiving resource allocation in a cellular network using an unlicensed band according to an embodiment of the present disclosure includes a transceiver configured to receive at least one resource assignment signal including information indicating a plurality of consecutive UL subframes communicable through the unlicensed band from an eNB during at least one DL subframe and to transmit UL data to the eNB during the consecutive UL subframes and a controller configured to identify the plurality of consecutive UL subframes based on the resource assignment signal and the other control signals and to notify the transceiver of the identified consecutive UL subframes.

BRIEF DESCRIPTION OF THE DRAWINGS

The above and other aspects, features and advantages of certain exemplary embodiments of the present disclosure will be more apparent from the following description taken in conjunction with the accompanying drawings.

FIGS. 1A and 1B illustrate a communication procedure using an unlicensed band;

Throughout the drawings, similar reference numerals will be understood to refer to identical or similar elements, features, and structures.

DETAILED DESCRIPTION

Figure 2:
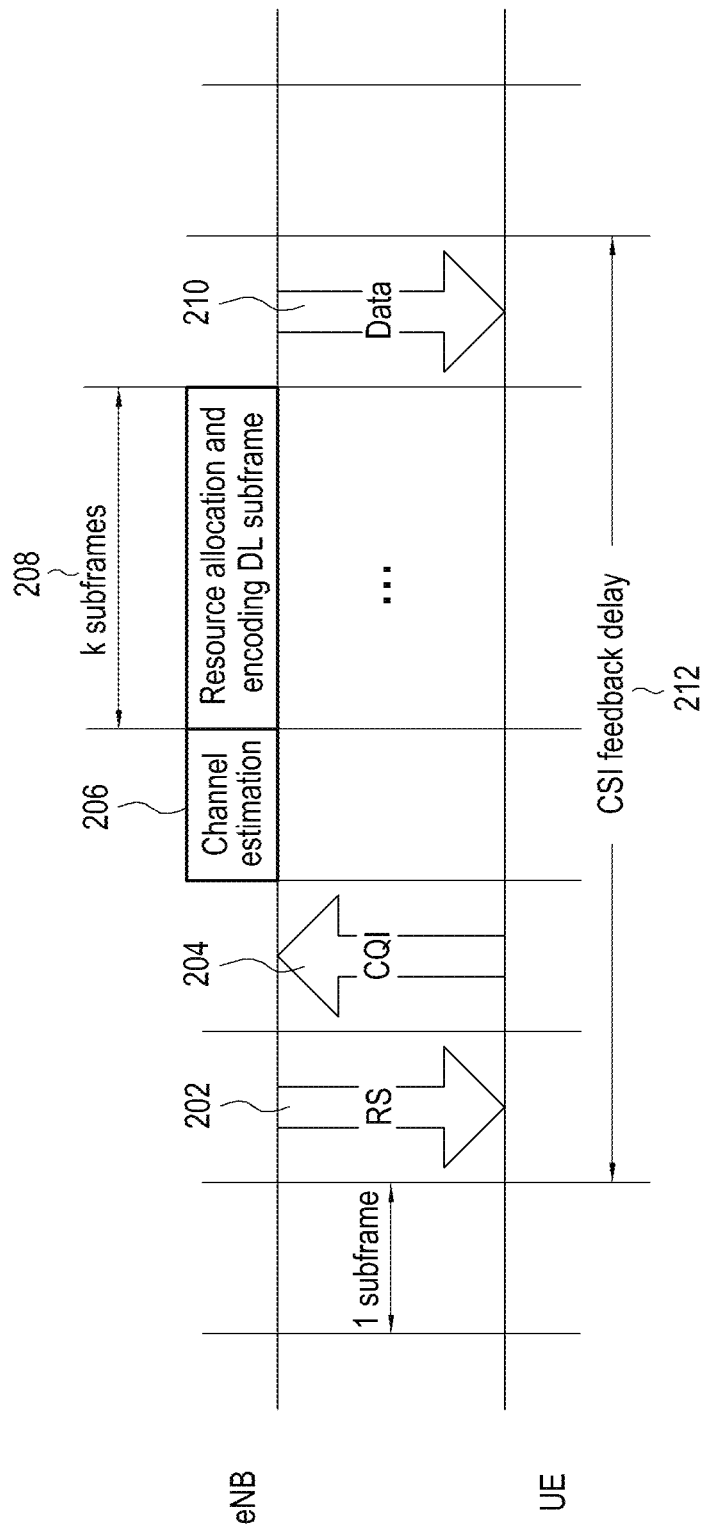
FIG. 2 illustrates a procedure for determining a transmission capacity of a transmission/reception link in existing cellular communication such as LTE.

Hereinafter, embodiments of the present disclosure will be described with reference to the accompanying drawings.

When embodiments of the present disclosure are described, technical matters that are well known in a technical field of the present disclosure and are not directly related to the present disclosure will not be described. By omitting an unnecessary description, the subject matter of the present disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims. Throughout the specification, an identical reference numeral will indicate an identical element.

It will be understood that each block of flowchart illustrations and combinations of the flowchart illustrations, may be implemented by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block(s).

In addition, each block represents a module, segment, or portion of code, which includes one or more executable instructions for implementing the specified logical function(s). It should also be noted that in other implementations, the function(s) noted in the blocks may occur out of the order. For example, two blocks shown in succession may, in fact, be executed substantially concurrently or the blocks may sometimes be executed in the reverse order, depending on the functionality involved.

In exemplary embodiments of the present invention, the term '~unit', as used herein, denotes a software or hardware component, such as a field programmable gate array (FPGA) or application specific integrated circuit (ASIC), which performs certain tasks. However, the meaning of '~unit' is not limited to software or hardware. '~unit' may advantageously be configured to reside on the addressable storage medium and configured to reproduce one or more processors. Thus, '~unit' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~units' may be combined into fewer components and '~units' or further separated into additional components and '~units'. In addition, components and 'unit(s)' may be implemented to execute one or more CPUs in a device or a secure multimedia card.

While a description will be focused on a wireless communication system having a particular channel structure when embodiments of the present disclosure are described in detail, a main subject matter to be claimed in the specification is also applicable to other communication systems and services having a similar technical background without significantly departing from a range disclosed herein, as will be obvious to those of ordinary skill in the art.

Before a detailed description of embodiments of the present disclosure is made, examples of interpretable meanings will be provided for several terms used herein. However, it should be noted that the meanings of the terms are not limited to the examples provided below.

A base station (BS) is an entity that communicates with a user equipment (UE), and may also be referred to as a BS, a base transceiver station (BTS), a NodeB (NB), an evolved NodeB (eNB), an access point (AP), or the like. In particular, at least one of the embodiments of the present disclosure described below may be implemented in a heterogeneous network (HetNet) including a main eNB and an auxiliary eNB, and the main eNB may be referred to as a Macro BS, a primary cell (PCell), etc., and the auxiliary eNB may be referred to as a Small BS, a secondary cell (SCell), etc.

The UE is an entity that communicates with the eNB, and may also be referred to as a UE, a device, a mobile station (MS), a mobile equipment (ME), a terminal, or the like.

In the heterogeneous network, the UE transmits and receives main system information and control signal, communicates mobility-sensitive traffic, such as voice, with a PCell, and communicates traffic having importance on an instantaneous transfer amount such as data, with an SCell. Herein, the PCell may be set to a licensed band, and the SCell may be set to a shared band, i.e., an unlicensed band. An example of such a type of a cellular communication system may include an LTE Licensed-Assisted Access (LAA) system. A UE additionally using a shared band may be referred to as an LAA UE and a UE using only an existing licensed band may be referred to as an LTE UE.

The UE in the eNB area is in a radio resource control (RRC) IDLE state or RRC CONNECTED state.

RRC IDLE: the UE selects an eNB (or Cell), monitors a paging channel, and obtains system information (SI), but does not exchange data with the eNB.

RRC CONNECTED: the UE monitors a control channel and exchanges data with the eNB through a data channel. The UE reports various measurement results of the eNB and neighboring eNBs to help scheduling of the eNB.

A device using an unlicensed band is classified into a frame based equipment (FBE) and a load based equipment (LBE). A description will now be made of a communication procedure based on each device.

FIG. 1A illustrates a communication procedure using an unlicensed band for the FBE.

Referring to FIG. 1A, a transmitter performs clear channel assessment (CCA) 102 for at least 20 μs (micro second) before performing transmission 104 through an unlicensed band. The CCA 102 is an operation in which the transmitter measures a magnitude of interference to determine whether another device is currently using the unlicensed band. The transmitter does not perform transmission if the measured magnitude of interference as a result of CCA is greater than or equal to a specific value, and performs transmission 104 if the measured magnitude of interference is less than the specific value. The transmission 104 has a fixed frame period 110 and starts at a start timing of a frame continuing immediately from a CCA period. The transmitter occupies (106) the unlicensed band from a minimum of 1 ms up to a maximum of 10 ms by performing CCA once, and has to be idle without performing transmission during a minimum of 5% of a channel occupancy time (COT) 106. This is called an idle period 108. If determining that another device is currently using the unlicensed band as the result of the CCA 102, the transmitter performs CCA again after the fixed frame period 110.

FIG. 1B illustrates a communication procedure using an unlicensed band for the LBE.

Referring to FIG. 1B, like in the FBE, a transmitter performs CCA 112 for at least 20 μs before performing transmission 116 through an unlicensed band. If determining that no device is currently using the unlicensed band as a result of the CCA 112, the transmitter performs transmission. However, if determining that another device is currently using the unlicensed band, the transmitter performs additional CCA 114 unlike in case of the FBE. This is called extended CCA (ECCA) 114. The ECCA 114 includes N times of CCA where N indicates a backoff counter value selected at random in [1, q], and q indicates a contention window size (CWS). The CWS may be given by an eNB or determined by a UE. If determining that no device is currently using the unlicensed band as a result of the ECCA 114, the transmitter performs transmission 116. A time during which the transmitter may occupy the unlicensed band, that is, an COT 118 is a maximum of (13/32)*q ms, after which the transmitter performs ECCA again, and during a time in which the transmitter executes the ECCA, the transmitter has an idle period 120.

The FBE and the LBE have advantages and disadvantages, respectively. In view of a probability of occupying an unlicensed band, the LBE may show better performance than the FBE. This is because the FBE may not be able to perform CCA again in a fixed frame period once failing in the CCA, whereas the LBE may perform ECCA, that is, N times of additional CCA, after failing in the CCA, so as to occupy the unlicensed band. Next, in view of scheduling, i.e., transmission of a control channel, the FBE is simpler than the LBE. The FBE may use the unlicensed band based on a subframe boundary, i.e., a control channel transmission timing. However, the LBE arbitrarily selects N that is the number of times of CCA in ECCA, such that a timing to start using the unlicensed band may not coincide with the subframe boundary. Thus, the LBE reserves a part of a $1^{st}$ subframe and performs transmission of a control channel and a data channel from a $2^{nd}$ subframe. The FBE damages nearby Wi-Fi devices sharing the unlicensed band less than the LBE. Generally, the LBE has a higher probability of occupying the unlicensed band than the FBE, which means that a Wi-Fi device takes more chances to occupy the unlicensed band.

Meanwhile, a UE, even when using the unlicensed band, needs to maintain connection to the licensed band to provide a reliable cellular communication service in a mobile environment. Thus, a service that is sensitive to a delay, such as voice, etc., is transmitted in the licensed band and a data service is transmitted using the licensed band and opportunistically, the unlicensed band, thereby improving a possible data transfer rate.

FIG. 2 illustrates a procedure for determining a transmission capacity of a transmission/reception link in existing cellular communication such as LTE.

Referring to FIG. 2, in a DL, a UE measures a reference signal (RS) 202 of an eNB and reports a signal quality of the RS 202 to the eNB through a channel quality indicator (CQI) 204. The RS 202 of the eNB may include a common/cell-specific reference signal (CRS) or a channel state information-reference signal (CSI-RS) commonly given to all UEs in a service area of the eNB or a UE-specific RS given to a particular UE. The UE may be controlled by the eNB to periodically or aperiodically report a channel quality to the eNB through the CQI 204. The UE uses an UL control channel for periodic report and uses an UL data channel for aperiodic report.

The eNB performs scheduling to determine a UE to which physical resource blocks are to be allocated based on the CQI 204 reported by the UE, and provides UE-specific allocation information to scheduled UEs based on the scheduling result in operations 206 and 208. A resource assignment (or allocation) signal (or an UL/DL grant) indicating a position of an allocated DL resource and resource assignment information (i.e., physical parameters such as a modulation and coding scheme (MCS) index and hybrid automatic repeat request (HARD)-related information) is scrambled by UE's identification, e.g., a cell radio network temporary identity (C-RNTI) or a mobile broadcast service (MBMS) RNTI (M-RNTI) and is transmitted through a physical downlink control channel (PDCCH), and the UE having received the resource assignment signal receives DL data on a physical downlink shared channel (PDSCH) through the physical resource blocks indicated by the resource assignment signal.

For the UL, the eNB measures an RS from the UE to recognize an UL signal quality. The RS of the UE may be a sounding RS (SRS) the eNB periodically (2-320 ms) allocates to a particular UE. Unlike in the current standards, a demodulation RS (DMRS) transmitted with UL data by the UE for operations in a shared band may be used for UL measurement in the unlicensed band. The eNB performs UL scheduling for determining a UE to which physical resource blocks are to be allocated, based on a CQI obtained by measurement of the RS transmitted from the UE, and provides UE-specific allocation information to scheduled UEs based on the scheduling result. A resource assignment signal indicating an allocated UL resource is scrambled by identification information of the UE and transmitted through a PDCCH, and the UE having received the resource assignment signal transmits UL data on a physical uplink shared channel (PUSCH) through physical resource blocks indicated by the resource assignment signal.

Until the eNB completes channel measurement and link adaptation with respect to the UE, a delay time longer than a predetermined time is needed due to necessary signal transmission/reception and processing. For example, referring to DL operations shown in FIG. 2, two subframes are consumed for the UE to measure an RS 202 (e.g., a CRS) transmitted from the eNB every DL subframe and to report a CQI 204 through a physical uplink control channel (PUCCH) allocated to each UL subframe. One subframe is needed for the eNB to perform channel estimation 206, and 1 through k subframes are needed to perform scheduling 208 for resource allocation and for determining an MCS index, depending on implementation. Therefore, a possible minimum CQI feedback delay 212 is 4 ms.

Since a minimum period of an SRS is 2 subframes in an UL, one more subframe delay is generated than in the UL such that the CQI feedback delay 212 is a minimum of 5 ms. As a period of the SRS increases, a total CQI feedback delay also increases.

As such, an existing LTE system may provide a minimum CQI feedback delay when a periodic RS is measured. However, in a shared band, such as an unlicensed band, where rules for co-existence of different communication systems are established, three problems may occur in application of existing resource allocation schemes as described below.

1) Inaccuracy of measurement of periodic RS
2) Non-continuous use of radio resources
3) Delay of CQI report timing As to the first problem, due to LBT regulations, it is not guaranteed that the eNB transmits a periodic RS, or in spite of no regulation problem, there may be a serious change in the amount of measurement with respect to the periodic RS. The UE performs measurement in a position of a periodically allocated RS, and if the eNB fails in an LBT attempt, the measurement may be performed in a resource position in which the RS is not actually transmitted. In a particular region such as Europe, even with LBT regulations, a short control signal (SCS) is allowed to be transmitted without using LBT. The SCS has to be designed such that the transmitter transmits the SCS by occupying only 5% of resources within 50 ms. Even if periodic RS transmission is possible in this way, the UE may undergo non-continuous interference from an adjacent Wi-Fi AP/UE or an asynchronous cell eNB or an LTE UE belonging to the asynchronous cell eNB. A cause for non-continuous interference may be CCA or a hidden node. For example, if a CCA threshold is set to the UE, the UE having received a signal from a non-serving eNB with higher power than the CCA threshold does not transmit its signal. In this case, transmission possibility of devices adjacent to the eNB may differ from when the eNB succeeds in LBT to when the eNB fails in LBT, resulting in a distinct difference in the amount of interference. The amount of interference causes inaccuracy in measurement of an RS. The first problem also occurs in the same manner when an SRS of a UE is transmitted in an UL.

The second problem corresponds to a case when an aperiodic RS is measured. That is, even if the eNB transmits a periodic RS, the UE resultantly performs measurement with respect to an aperiodic RS depending on whether LBT succeeds or fails, causing a problem of a measurement error. Whether LBT succeeds or fails is arbitrary, such that a channel measured when LBT succeeds last and a channel measured when LBT succeeds currently are highly likely to be different from each other. When one UE is allocated with a plurality of consecutive subframes, the eNB may perform scheduling based on a channel quality measured in a previous subframe, but a delay of at least 4 ms may be generated between channel measurement and resource allocation as mentioned above. That is, resource allocation based on a CQI measured in an $n^{th}$ subframe is possible in an $(n+4)^{th}$ subframe. Thus, if there is a large difference between a timing when LBT succeeds last and a timing when LBT succeeds currently, transmission in current first four subframes may be performed inevitably based on an inaccurate channel measurement value.

The third problem is that an additional delay time for reporting a CQI is generated, making accurate channel measurement difficult. This problem may occur when data transmission is performed in a DL. That is, when the UE measuring an RS of the eNB performs reporting with an UL resource allocated by the eNB, if the eNB fails in CCA for an FBE, a delay of four subframes or more is generated for reception of a new grant by the UE; if the UE fails in CCA for reporting measurement, an additional delay of four subframes or more may be generated. In the same situation, for an LBE, various UEs in an eNB may contend to transmit a measurement report on an UL.

In embodiments described below, a resource allocation scheme capable of minimizing a loss, taking the above-deduced three problems into account, will be proposed.

Because of a difficulty in periodic channel measurement, the UE performs CQI reporting based on a channel measurement value that is obtained after the eNB succeeds in LBT and occupies a channel. To this end, the eNB allocates a resource of temporally adjacent subframes to the UE.

Although assuming aperiodic channel measurement, a delay of a minimum of 4 ms in a DL and a delay of a minimum of 5 ms in an UL may be generated. Thus, for example, in a DL, a CQI measured in the first subframe may be reflected into scheduling only after a COT is longer than at least 4 ms. As a result, the eNB may not be able to perform MCS determination with respect to four frames based on an accurate CQI during 4 ms, and thus selects a conservative MCS index for the subframes.

If LBT of the UE fails, that is, a busy channel is detected, the UE needs to receive resource allocation from the eNB again, and a delay of 7 ms for resource allocation may be generated including a scheduling request (SR), an interval of 3 ms, an UL grant, an interval of 4 ms, and an order of data transmission. Thus, if determining that an LBT failure rate is high, the eNB may allocate resources for consecutive subframes through a single grant.

Figure 3A:
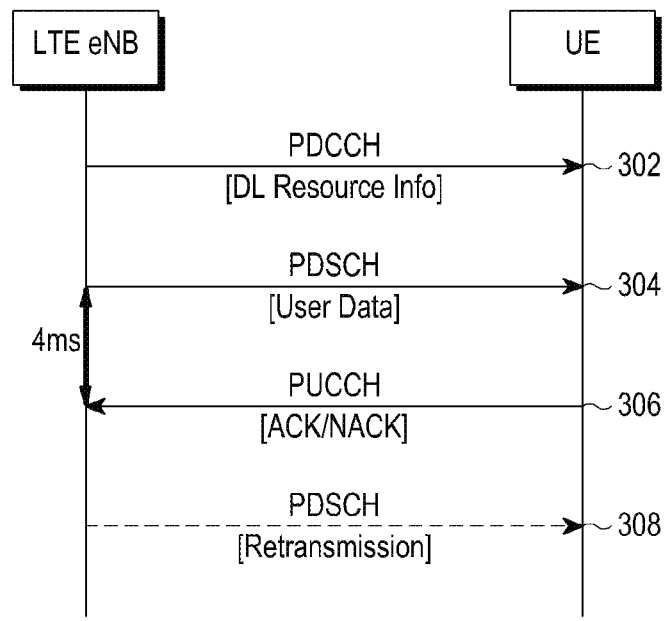
FIG. 3A illustrates an example of a downlink (DL) scheduling procedure applicable to an embodiment of the present disclosure.

FIG. 3A illustrates an example of a DL scheduling procedure applicable to an embodiment of the present disclosure.

Referring to FIG. 3A, in operation 302, an eNB transmits DL resource information indicating physical channel parameters (e.g., an MCS index, etc.) and resources allocated by scheduling to a UE through a PDCCH. In operation 304, the eNB transmits user data through a PDSCH on physical resource blocks indicated by the DL resource information. In operation 306, the UE transmits an ACK/NACK that is an HARQ response with respect to the user data. A delay of 4 ms may be generated between the user data of the DL and the ACK/NACK. If the HARQ response is the NACK, the eNB retransmits the user data in operation 308.

Figure 3B:
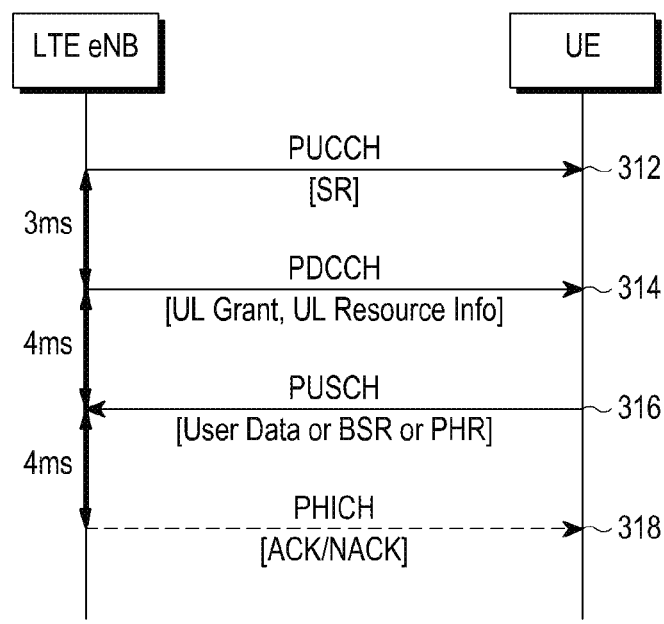
FIG. 3B illustrates an example of an uplink (UL) scheduling procedure applicable to an embodiment of the present disclosure.

FIG. 3B illustrates an example of an UL scheduling procedure applicable to an embodiment of the present disclosure.

Referring to FIG. 3B, in operation 312, the UE having user data or control information to be transmitted in an UL transmits an SR to the eNB through a PUCCH. The eNB performs scheduling in response to the SR, and transmits an UL grant corresponding to the scheduling, that is, UL resource information through a PDCCH in operation 314. The scheduling may consume, e.g., 3 ms. In operation 316, the UE transmits user data, a buffer status report (BSR), or a power headroom report (PHR) through a PUSCH on a physical resource block indicated by the UL resource information. To prepare for UL transmission through the PUSCH, 4 ms may be required. In operation 318, the eNB transmits, through a physical HARQ indication channel (PHICH), an ACK/NACK with respect to UL reception through the PUSCH.

Figure 4A:
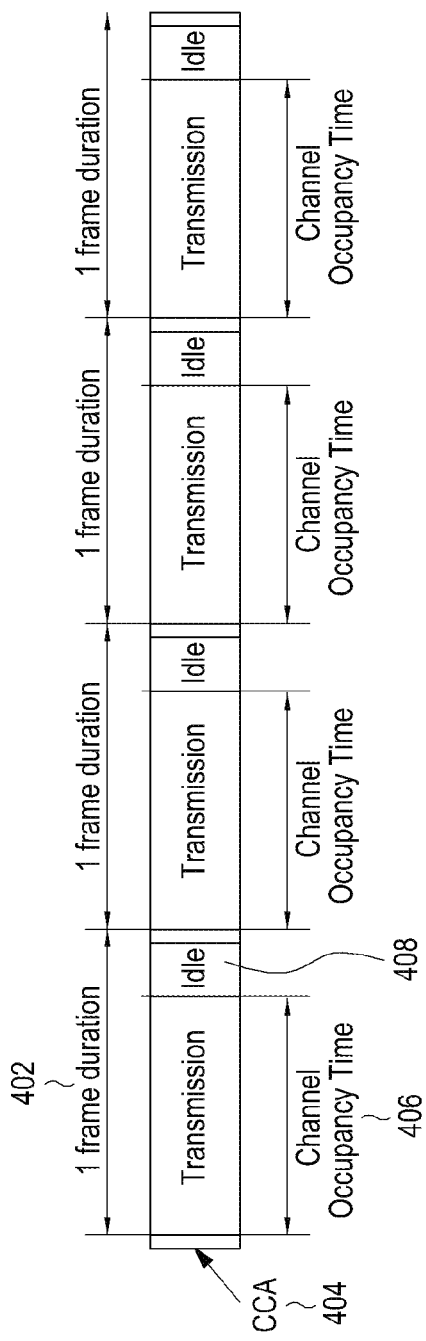
FIG. 4A illustrates a frame structure for an unlicensed band applicable to an embodiment of the present disclosure.

FIG. 4A illustrates an FBE frame structure for an unlicensed band applicable to an embodiment of the present disclosure.

Referring to FIG. 4A, in an FBE frame structure, one frame duration 402 may include ten subframes, that is, 10 ms, taking an LTE structure into account. For a COT 406 and an idle period 408, resource allocation has to be performed so as for the eNB to comply with regulation requirements. For example, if the COT 406 is 9 ms, the idle period 408 needs to be longer than 5% (9*0.05=0.45) of the COT 406. According to regulation requirements, the idle period 408 in the one frame duration 402 of 10 ms may be 1 ms.

Figure 4B:
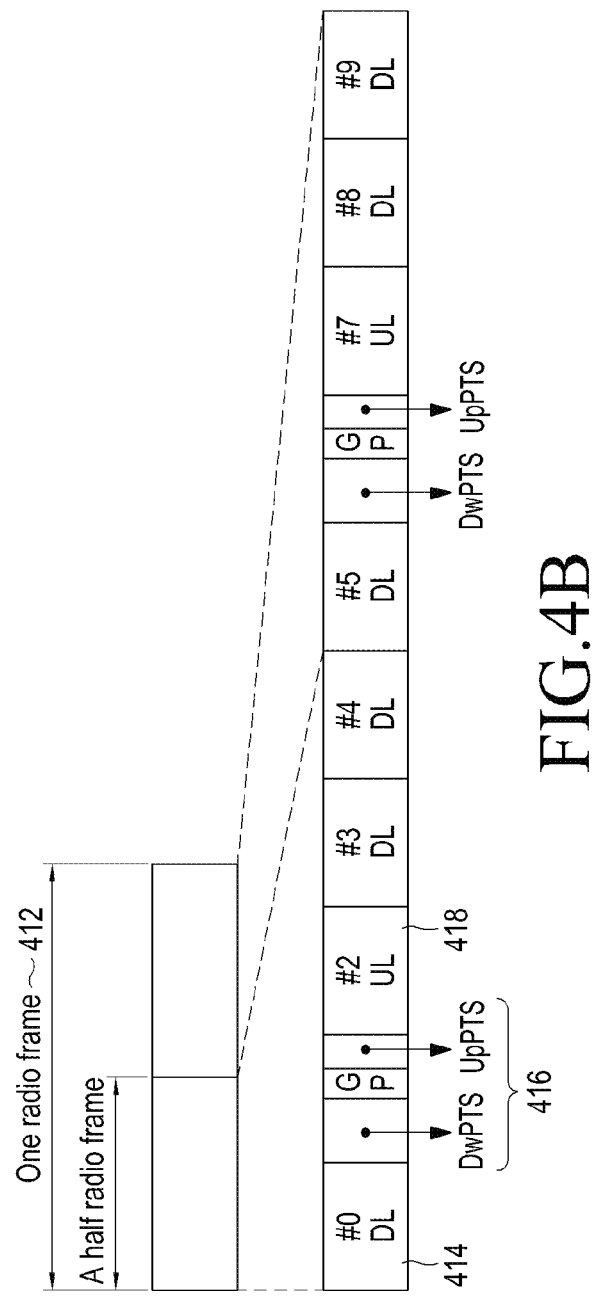
FIG. 4B illustrates a radio frame structure applicable to an embodiment of the present disclosure.

FIG. 4B illustrates a radio frame structure applicable to an embodiment of the present disclosure.

Referring to FIG. 4B, one radio frame 412 includes ten subframes, each of which may operate as a DL subframe 414, a special subframe 416, or an UL subframe 418 depending on an UL/DL subframe configuration. In one radio frame 412, the role, number, and position of subframes are configured by the eNB through high-layer signaling. A special subframe 416 exists between a DL subframe 414 and an UL subframe 418, and includes a downlink pilot time slot (DwPTS), a gap period (GP), and an uplink pilot time slot (UpPTS). In an illustrated example, in an UL/DL subframe structure used in an unlicensed band, DL subframes are consecutively allocated and continuously, UL subframes are consecutively allocated.

The eNB performs LBT in a CCA period 404 for signal transmission, and if determining that a channel is empty (that is, LBT succeeds), performs resource allocation. Various embodiments of resource allocation performed by the eNB will be described below.

Figure 5:
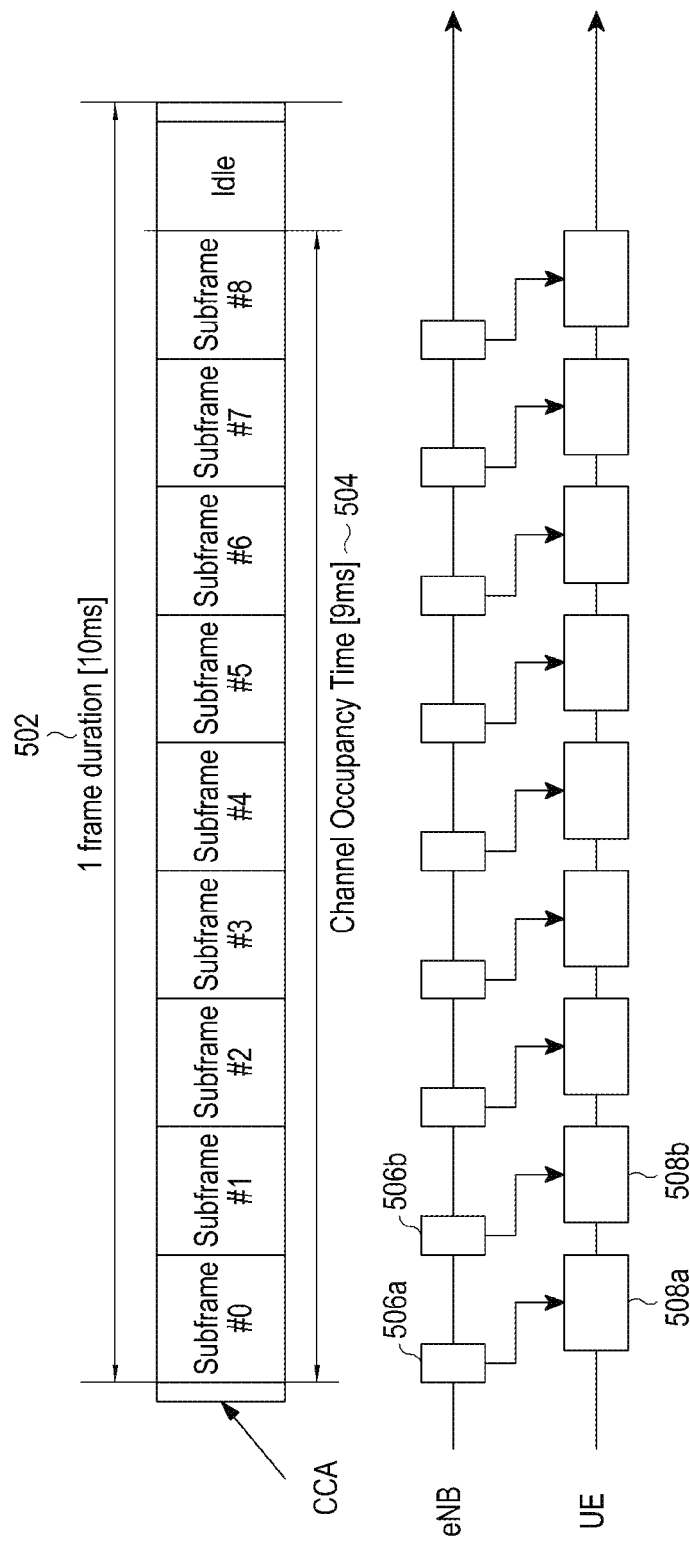
FIG. 5 illustrates single-subframe resource allocation according to an embodiment of the present disclosure.

FIG. 5 illustrates single-subframe resource allocation according to an embodiment of the present disclosure.

Referring to FIG. 5, the eNB notifies resource position and resource allocation information (e.g., including an MCS index and/or HARQ-related information) of the UE through a control channel (PDCCH or ePDCCH) 506a or 506b every subframe included in a COT 504 in a frame duration 502. The UE performs data communication in each subframe 508a or 508b according to the control channel 506a or 506b of each subframe. From a subframe #0 to a subframe #3, the eNB has no previous CQI report, and thus determines resource allocation information according to a transmission format (an MCS index, etc.) determined by the eNB without reflecting a CQI report. Hence, a control channel from the subframe #0 to the subframe #3 is likely to indicate the same transmission format.

Figure 6:
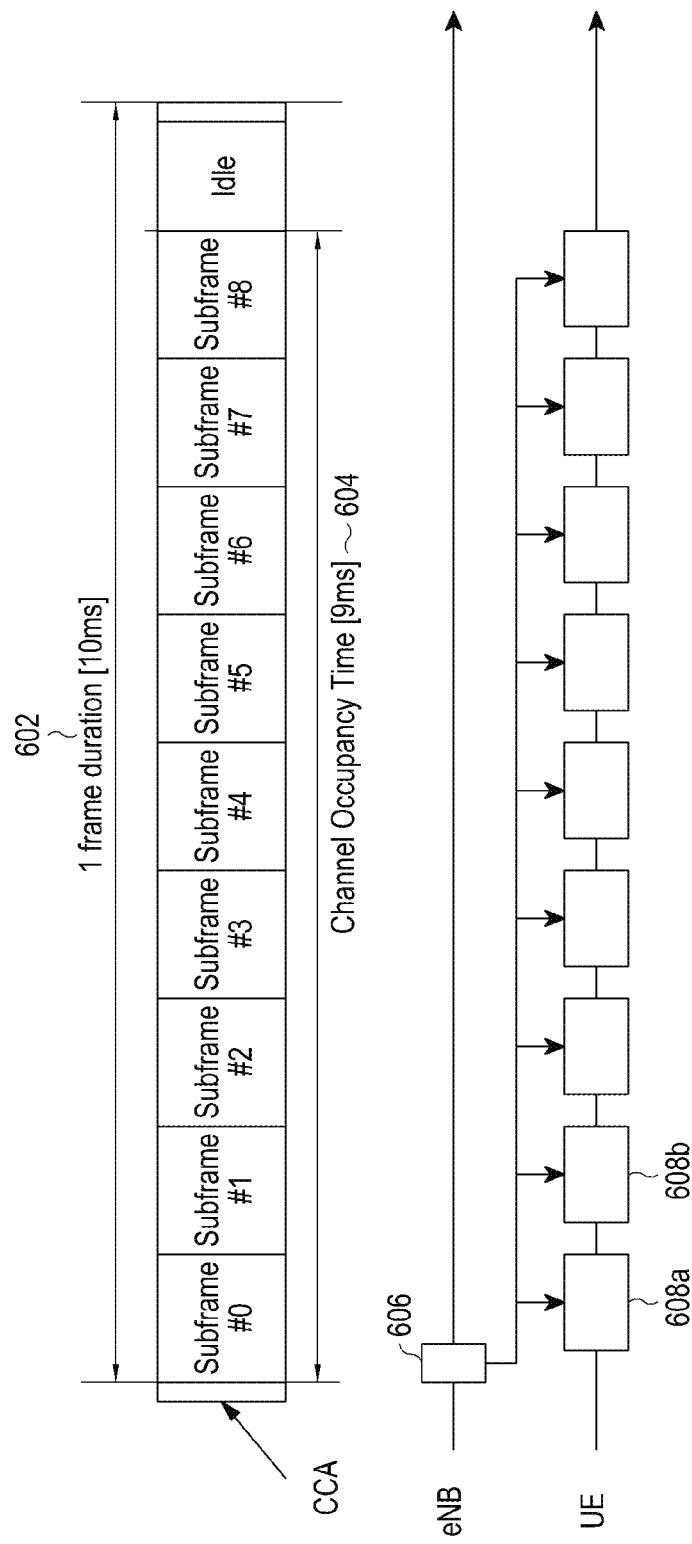
FIG. 6 illustrates plural-subframe resource allocation according to an embodiment of the present disclosure.

FIG. 6 illustrates plural-subframe resource allocation according to an embodiment of the present disclosure.

Referring to FIG. 6, the eNB notifies resource position and resource allocation information (e.g., an MCS index and/or HARQ related information) of the UE for the other subframes in a COT 604 through a control channel (PDCCH or ePDCCH) 606 of the first subframe in a frame duration 602 after an LBT success. The UE performs data communication in subframes 608a and 608b corresponding to the control channel 606 of the first subframe. By performing resource allocation with respect to a plurality of subframes by using the control channel 606 of one subframe, a load of the control channel may be reduced, but the eNB may not be able to allocate a proper transmission format (an MCS index, etc.) from a subframe #4 based on a CQI reported from a subframe #0.

Figure 7:
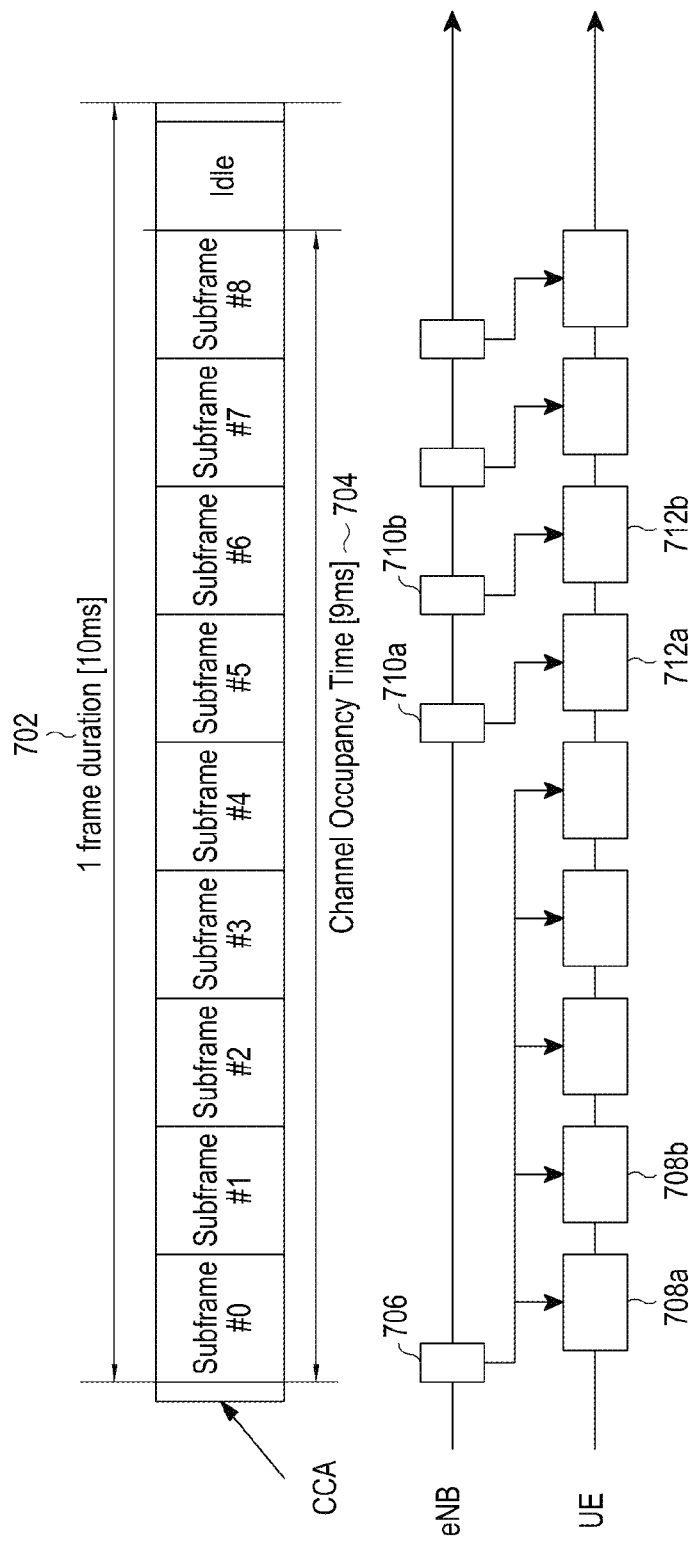
FIG. 7 illustrates hybrid-subframe resource allocation according to an embodiment of the present disclosure.

FIG. 7 illustrates hybrid-subframe resource allocation according to an embodiment of the present disclosure.

Referring to FIG. 7, a plural-subframe control channel 706 for subframes #0 through #3 and single-subframe control channels 710a and 710b for subframes #4 through #8 are separated. That is, the eNB notifies resource position and resource allocation information of the UE for a predetermined number of (e.g., four) subframes 708a and 708b in a COT 704 through the control channel (PDCCH or ePDCCH) 706 of the first subframe in a frame duration 702 after an LBT success. The UE performs data communication in the four subframes 708a and 708b corresponding to the control channel 706 of the first subframe. The eNB may adaptively allocate a transmission format from the subframe #4 based on a CQI reported from the subframe #0. Thus, the control channels 710a and 710b for subframes following the subframe #4 in the COT 704 include resource position and resource allocation information determined based on a CQI, and the UE performs data communication in respective subframes 712a and 712b corresponding to the control channels 710a and 710b of the subframes #4 through #8.

Figure 8:
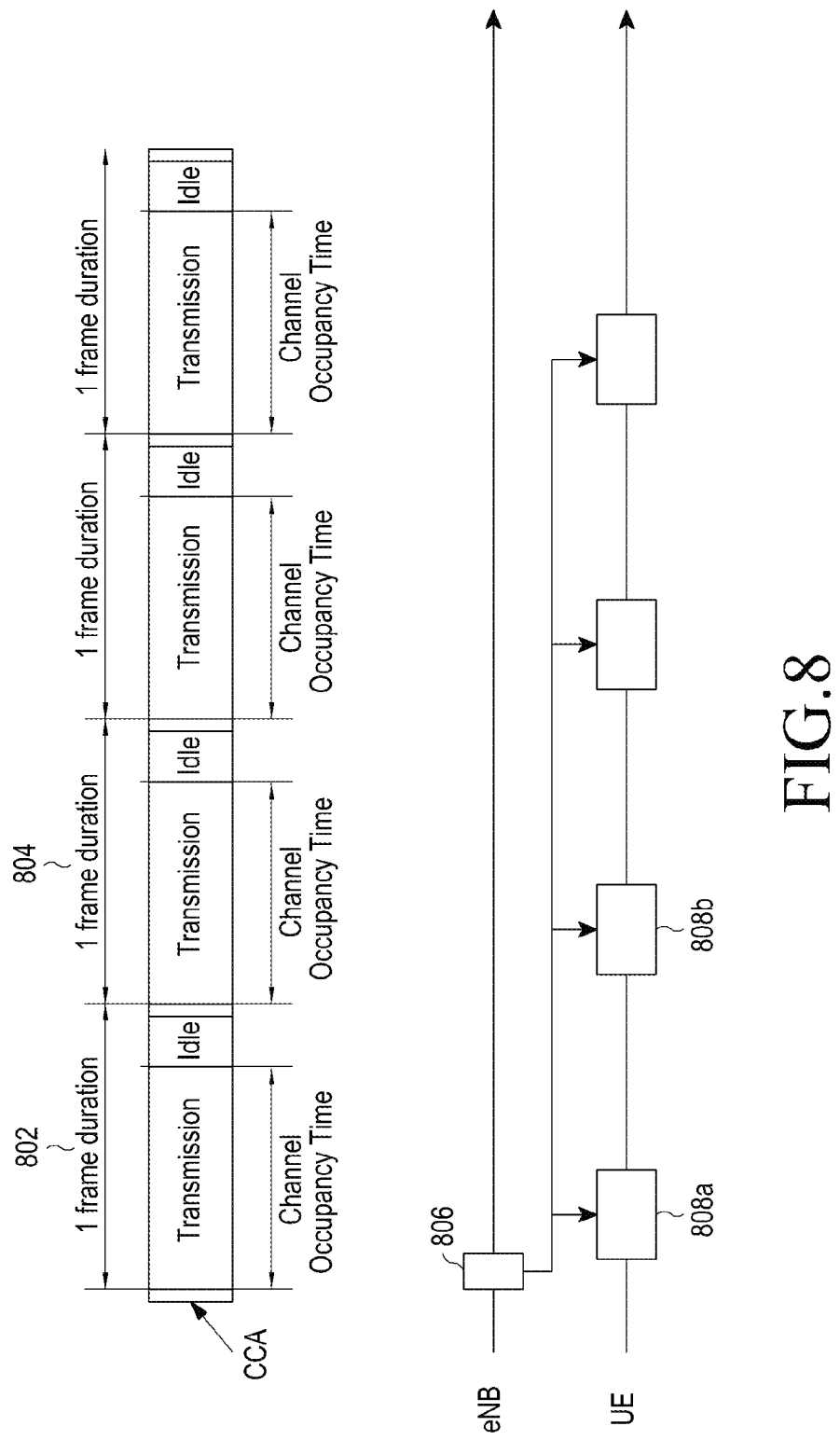
FIG. 8 illustrates plural-frame resource allocation according to an embodiment of the present disclosure.

FIG. 8 illustrates plural-frame resource allocation according to an embodiment of the present disclosure.

Referring to FIG. 8, through a control channel 806 of a first subframe in a first frame duration 802 after an LBT success, an eNB notifies resource position and resource allocation information of an UE for the first frame duration 802 and at least one frame duration 804 continuing therefrom. The UE performs data communication in a plurality of corresponding subframes 808a and 808b in the plurality of frame durations 802 and 804 using the control channel 806 of the first frame.

To perform in advance resource allocation with respect to a plurality of subframes (or frames, hereinafter, collectively referred to as a plurality of subframes), a control channel needs to include a resource assignment signal containing information about an additionally allocated resource. The eNB may include, a resource assignment or allocation signal for plural-subframe resource allocation, an identifier for distinguishing the resource assignment signal for the plural subframe resource allocation from an existing resource assignment signal for single subframe resource allocation. In an embodiment, the identifier may include an absolute value of a subframe number or a system frame number (SFN) for indicating a position of a resource to be allocated in the future, or an offset (a frame or subframe unit) for a subframe through which a current resource assignment signal is transmitted. The eNB may also include in the plural-subframe resource assignment signal, information indicating that additional allocation for N subframes (or N frames) is to be included.

Once receiving the control channel, the UE determines whether the control channel includes the existing resource assignment signal (i.e., the single-subframe resource allocation) or a new resource assignment signal for the plural-subframe resource allocation. For the plural-subframe resource allocation, the UE identifies a position of an allocated resource (across a plurality of subframes or a plurality of frames) based on the currently received resource assignment signal. The UE performs data communication in the identified resource position.

If CCA is configured for LBT ahead of the allocated resource position, the UE determines whether an RS or a channel securing notification signal is received to check if a serving eNB has secured a channel. Once receiving the RS or channel securing notification signal from the serving eNB, the UE performs data communication according to a transmission format indicated by the serving eNB in a resource position allocated in advance by the plural-subframe resource assignment signal received in advance. For a case where the UE receives a grant through a PCell or another SCell, the eNB indicates to the UE whether to check the RS or channel securing notification signal of the eNB.

For an UL, the eNB performs LBT ahead of a previously allocated resource through a plural-subframe resource assignment signal. If succeeding in LBT, the UE performs transmission in a position of the previously allocated resource through the resource assignment signal according to a transmission format indicated in advance by the eNB. If failing in LBT of the UE, the UE waits until a previously allocated next CCA period to perform an identical LBT operation. In an embodiment, for a plurality of resources allocated by single resource allocation and CCAs performed ahead of the position of the resources, the UE may selectively perform LBT with respect to only some CCAs, instead of performing LBT with respect to all of the CCAs. Resource(s) for which such selective LBT is to be performed may be set by the eNB or may be selected by the UE at random or under certain conditions.

In an embodiment, the UE may transmit success/failure information of LBT to the eNB. The success/failure information of the LBT may be transmitted together with UL data or a feedback signal, and may include a bitmap, a subframe index, a success/failure subframe number, etc., corresponding to a plurality of CCA periods. In an embodiment, the UE may report LBT success/failure information in an immediately previous subframe or a UE's scheduling ID (e.g., a C-RNTI or M-RNTI) of a previous subframe or a current subframe to the eNB. The eNB may determine that UE's transmission allocated to the previous subframe is delayed by one subframe due to an LBT failure according to the report from the UE. The scheduling ID may be replaced with an HARQ process ID, depending on a system.

[Configuration of Multiple UL (M-UL) Grant]

In an existing LTE system, the eNB indicates an UL resource and transmission parameters (an MCS index, etc.) for one UL subframe by using one UL grant (i.e., one resource assignment signal). Generally, an interval of a minimum of 4 ms is required between a timing when an UL grant is transmitted and a position of a UL resource (e.g., an UL subframe allocated a PUSCH). This interval is determined based on a time required for the UE to configure an UL transmission block containing transmission data after receiving the UL grant. In existing LTE standards, to simplify operations, the UL grant and the allocated PUSCH are designed to operate with a fixed interval of 4 ms there between. <Table 1> below shows information element (IE) fields included in an UL grant in an existing LTE system.

TABLE 1

| Field | Length (Bits) | |
|---|---|---|
| Flag for format0/format1A differentiation | 1 | |
| Hopping flag | 1 | |
| N_ULhop | 1 | 1.4 Mhz |
| | 1 | 3 Mhz |
| | 1 | 5 Mhz |
| | 2 | 10 Mhz |
| | 2 | 15 Mhz |
| | 2 | 20 Mhz |
| Resource block assignment | 5 | 1.4 Mhz |
| | 7 | 3 Mhz |
| | 7 | 5 Mhz |
| | 11 | 10 Mhz |
| | 12 | 15 Mhz |
| | 13 | 20 Mhz |
| MCS and RV | 5 | |
| NDI (New Data Indicator) | 1 | |
| TPC for PUSCH | 2 | |
| Cyclic shift for DM RS | 3 | |
| UL index (TDD only) | 2 | |
| Downlink Assignment Index (DAI) (TDD only) | 2 | |
| CQI request (1 bit) | 1 | |

A UL grant may include at least one of a flag indicating a format of DL control information (DCI) included in the UL grant, i.e., a flag for format0/format1A differentiation, a hopping flag indicating whether frequency hopping is applied in an allocated resource, N_ULhop indicating an interval of frequency hopping, resource block assignment (RBA) indicating a position of an allocated resource, an MCS, a redundancy version (RV), a new data indicator (NDI), cyclic shift (CS) information for a DMRS sequence, an UL subframe index for a time division duplex (TDD) mode, a DL assignment index (DAI) for the TDD mode, a CQI request, a resource assignment type, and transmit power control (TPC).

A position of an allocated UL resource is indicated by an RBA field, and since the number of resource blocks (RBs) with respect to a bandwidth (BW) is given as Max_RB, the number of allocated RBs is N_RB=floor(RBA/Max_RB)+1, and a start position of allocated RBs is RB_offset=RBA mod Max_RB. Herein, RB_offset is indicated through the UL grant in initial transmission and through a PHICH in retransmission. The eNB may indicate change of RB_offset and a CS of the DMRS for a retransmitted packet through the PHICH.

In an embodiment, to allocate a plurality of UL resources (subframes or frames), a plurality of grants are used, and each UL grant may indicate one UL resource. Each UL grant indicates at least one UL resource block provided on a time/frequency domain in one UL subframe. Therefore, the eNB may variously designate an interval from UL grants to corresponding PUSCHs, to indicate the UE to use UL resource blocks in a plurality of UL subframes.

In another embodiment, the eNB may allocate UL RBs for consecutive UL subframes by using one grant. According to characteristics of LBT, a discontinuous resource access attempt causes frequent contention and increases a probability of another device securing a channel, such that if resource securing succeeds once, it is efficient to continuously use resources.

If PUSCH transmission for N consecutive UL subframes is indicated by one grant, the eNB may indicate a UL subframe in which LBT may be performed and an UL subframe in which PUSCH transmission may be performed. In another embodiment, the eNB may indicate an UL subframe in which both LBT and PUSCH transmission may be performed and an UL frame in which only PUSCH transmission may be performed. In an embodiment, the eNB may further indicate an UL subframe in which both LBT and SRS transmission may be performed or an UL subframe in which both LBT and physical random access channel (PRACH) transmission may be performed. The UL subframe may be indicated using a UE-specific control signal or a common control signal. For example, an UL subframe capable of performing LBT may be indicated using a common control signal.

Hereinbelow, various embodiments of a method for indicating UL subframes for LBT and PUSCH transmission occasions by the eNB will be described.

a) According to an indication of N LBT UL subframes and N PUSCH transmission occasions, the LBT UL subframes and the PUSCH transmission occasions operate based on a one-to-one correspondence (N is a positive integer). In case of at least one LBT failure, the number of PUSCH transmission occasions actually performed is equal to or less than N. The eNB may indicate LBT occasions and PUSCH occasions using an identical control signal.

b) According to an indication of N LBT UL subframes and N PUSCH transmission occasions, if LBT succeeds in the LBT UL subframes, N continuous PUSCH transmissions start. If LBT succeeds once in the LBT UL subframes, the number of PUSCH transmission occasions is equal to N in spite of an LBT failure. The eNB may indicate LBT occasions and PUSCH occasions using an identical control signal.

c) According to an indication of N LBT UL subframes and M PUSCH transmission occasions, LBT UL subframes and PUSCH transmission occasions operate based on a one-to-one correspondence (N, M are positive integers). In case of at least one LBT failure, the number of PUSCH transmission occasions is equal to or less than M. The eNB may separately indicate LBT occasions and PUSCH occasions using different messages.

d) According to an indication of N LBT UL subframes and M PUSCH transmission occasions, if LBT succeeds in the LBT UL subframes, M continuous PUSCH transmissions start. If LBT succeeds once in the LBT UL subframes, the number of PUSCH transmission occasions is equal to M in spite of an LBT failure. The eNB may separately indicate LBT occasions and PUSCH occasions using different messages.

e) According to an indication of N LBT and PUSCH transmission UL subframes and M PUSCH transmission occasions, if LBT succeeds in an LBT UL subframe (i.e., an $n^{th}$ subframe), M consecutive PUSCH transmissions start from an $(n+1)^{th}$ UL subframe.

N LBT UL subframes (i.e., LBT occasions) are indicated by a grant or by a separate control signal such as common DCI, common UL control information (UCI), RRC signaling, DL/UL subframe configuration (start/length) information, etc. N or M PUSCH transmission occasions are indicated by a grant or by a separate control signal such as dedicated UCI, RRC signaling, etc. If the number of LBT UL subframes and the number of PUSCH transmission occasions are equal to each other, an identical signal (or grant or RRC signaling) may indicate the number of LBT UL subframes and the number of PUSCH transmission occasions at a time.

In an embodiment, LBT UL subframes may be indicated to be discontinuously disposed with an interval of K therebetween. If K is 2, it means that UL subframes are set to [0, 3, 6, . . . ], and if K is 1, it means that UL subframes are set to [0, 2, 4, 6, . . . ], and if K is 0, it means that UL subframes are set to [0, 1, 2, 3, 4, 5, 6, . . . ]. K may be indicated by a grant, common/dedicated UCI, or RRC signaling. In this case, the number of PUSCH transmission occasions, M, is set to be equal to N or to N×K.

In an embodiment, the eNB may transmit an index indicating one of sets of LBT UL subframes. For example, if an index is 0, it indicates a set of UL subframes [0, 1, 2, 6, 7, 8] and if an index is 1, it indicates a set of UL subframes [1, 4, 7, 9]. In an embodiment, each set of UL subframes may be indicated by a bitmap that may be transmitted by the eNB. For example, a set of UL subframes [1, 4, 7, 9] may be indicated by a bitmap {0,1,0,0,1,0,0,1,0,1}.

The UE determines an UL subframe or a PUSCH in which transmission is to be performed, according to a predetermined rule, when receiving a grant (or RRC signaling) of the eNB, which indicates the LBT UL subframes. Hereinbelow, various embodiments of an eNB's grant and UE's interpretation thereof will be described. In the following embodiments, performing LBT in a particular subframe may be a part of an LBT procedure of the UE. That is, the UE starts an LBT procedure before the particular subframe and performs the remaining part of the LBT procedure in a CCA or ECCA period of the particular subframe.

In an embodiment, the UE regards a subframe after x subframes from a subframe in which the UE receives a grant as start of an LBT UL subframe. The UE performs LBT in an indicated subframe and transmits UL data in a subsequent PUSCH transmission resource in case of an LBT success. For example, if a grant is received in an $n^{th}$ subframe and an $(n+x)^{th}$ subframe includes [CCA][PUSCH] (herein, [CCA] means a CCA period and [PUSCH] means a PUSCH period), the UE performs LBT in a CCA period of the $(n+x)^{th}$ subframe and if succeeding in LBT, the UE performs PUSCH transmission in a PUSCH period of the $(n+x)^{th}$ subframe. In another example, if the $(n+x)^{th}$ subframe and an $(n+x+1)^{th}$ subframe include [PUSCH][CCA], the UE performs LBT in the CCA period of the $(n+x)^{th}$ subframe and performs PUSCH transmission in a PUSCH period of the $(n+x+1)^{th}$ subframe.

In an embodiment, the UE regards a subframe indicated by a grant as a PUSCH transmission occasion, i.e., start of a UL PUSCH transmission subframe. The UE performs LBT before an indicated subframe and transmits UL data in a PUSCH transmission resource of the indicated subframe. For example, if the grant indicates the $(n+x)^{th}$ subframe which includes [CCA][PUSCH], the UE performs LBT in the CCA period of the $(n+x)^{th}$ subframe and performs PUSCH transmission in a PUSCH period of the $(n+x)^{th}$ subframe if succeeding in LBT. In another example, if the grant indicates the $(n+x)^{th}$ subframe, and an $(n+x-1)^{th}$ subframe and the $(n+x)^{th}$ subframe include [PUSCH][CCA], then the UE performs LBT in the CCA period of the $(n+x-1)^{th}$ subframe and performs PUSCH transmission in the PUSCH period of the $(n+x)^{th}$ subframe.

An UL subframe index (ULSI) in an UL grant indicating an allocated UL subframe resource may be expressed by one of various schemes provided below according to a time criterion.

1) An ULSI is expressed based on a subframe index of a PCell.

2) An ULSI is expressed based on a subframe index of a scheduling cell carrying a control channel.

3) An ULSI is expressed based on a subframe index of a scheduled cell carrying data.

4) An ULSI is expressed based on a start subframe of a DL burst (DL subframes).

5) An ULSI is expressed based on a start subframe of a UL burst (UL subframes).

When an UL subframe to be communicated using an unlicensed band is determined, the UE determines a CWS and performs contention window (CW) countdown from the CWS.

The CW is generally an exponential back-off algorithm needed for an access to a resource in the unlicensed band. The transmitter attempts LBT in an initial CCA period, e.g., for 20 µs, and compares an energy level measured in the initial CCA period with a CCA threshold to determine whether LBT succeeds or fails. If the measured energy level (in dBm) is greater than the CCA threshold, the transmitter determines that the channel is occupied (busy); otherwise, the transmitter determines that the channel is empty (idle). If the channel is idle, transmission may be performed immediately after the initial CCA period. If the channel is busy, the transmitter switches to the ECCA procedure. ECCA includes N CCAs, where N is an arbitrarily selected value in [1, q] and q is a CWS value. In this case, the parameter q may be adjusted depending on a circumstance. A range of q may be controlled between a minimum of q(min_q) and a maximum of q(max_q). When ECCA is initially performed, min_q is used. A value of the parameter q may be increased from min_q, for example, on a two-fold basis according to a particular condition. For example, in a wireless local area network (LAN) system, if the receiver does not send an ACK, the transmitter interprets non-reception of the ACK as a NACK and sets a value of q to be used in the next ECCA to min_qx2. Once the ACK is received from the receiver, the transmitter sets the value of q to be used in the next ECCA to the initial value min_q. Various types of the back-off algorithm may be used depending on a system. For cellular mobile communication, for example, if 80% of HARQ ACK feedbacks with respect to the first DL subframe of a DL burst (consecutive DL subframes) transmitted by the eNB are NACKs, the value of q may be increased twice.

The UE determines a CWS from any one of the following situations and performs CW countdown.

1) When a UL traffic is generated in the UE and thus a UL transmission request arrives at a physical layer from a high layer, 2) When an SR is transmitted to the eNB in response to generation of the UL transmission request in the UE, 3) When the UE transmits the SR to the eNB and receives a UL grant from the eNB, 4) When the UE transmits a BSR with respect to the UL grant from the eNB, and 5) When the UE receives the ACK with respect to the BSR through a PHICH.

Hereinbelow, multi-grants (i.e., grants with respect to a plurality of subframes (multi-subframes)) and operations of the UE and the eNB will be described in detail. More specifically, the following description will be made of various embodiments to determine 1) when to perform PUSCH transmission, 2) when to perform LBT, 3) which HARQ process ID is to be sent, and 4) a procedure in case of an LBT failure, as the UE receives a grant.

<Table 2> shows IE fields included in multi-grants according to an embodiment of the present disclosure.

TABLE 2

| Field | Length (Bits) | |
|---|---|---|
| Flag for format0/format1A differentiation | 1 | |
| Hopping flag | 1 | |
| N_ULhop | 1 | 1.4 Mhz |
| | 1 | 3 Mhz |
| | 1 | 5 Mhz |
| | 2 | 10 Mhz |
| | 2 | 15 Mhz |
| | 2 | 20 Mhz |
| Resource block assignment | 5 | 1.4 Mhz |
| | 7 | 3 Mhz |
| | 7 | 5 Mhz |
| | 11 | 10 Mhz |
| | 12 | 15 Mhz |
| | 13 | 20 Mhz |
| MCS and RV | 5 | |
| HARQ process | (Nx)3 | |
| NDI (New Data Indicator) | 1 | |
| TPC for PUSCH | 2 | |
| Cyclic shift for DM RS | 3 | |
| UL index (TDD only) | 2 | |
| Downlink Assignment Index (DAI) (TDD only) | 2 | |
| CQI request (1 bit) | 1 | |
| 1) Multi-subframe Assignment - Start | 2 for [0, 1, 2, 3] or 3 for [0, 1, . . . , 7] or 3 for [−3, −2, −1, 0, 1, 2, 3, 4] | |
| 2) Multi-subframe Assignment - Length | 2 for [1, 2, 4, 8] or 3 for [1, 2, 3, 4, 5, 6, 7, 8] | |
| 3) Multi-subframe Assignment - End | 2 for [3, 4, 5, 6] or 3 for [3, 4, . . . , 10] or 3 for [−1, 0, 1, 2, 3, 4, 5, 6] | |

In the above table, a number in [ ] is a table mapped to a bit string to express a discontinuous value. For example, in [1,2,4,8], 1 may be expressed as 00, 2 may be expressed as 01, 4 may be expressed as 10, and 8 may be expressed as 11.

In <Table 2>, a UL grant may include at least one of a multi-subframe assignment (MSA) Length field and an MSA-End field. A non-included field may be notified to the UE implicitly through another control signal or explicitly through a high-layer message such as RRC signaling or an SIB. The MSA-length field may indicate one subframe, but may also indicate the number of unit groups if a plurality of subframes continuously allocated without using LBT in the middle. For example, if a basic unit of scheduling of the plurality of subframes is set to 2 subframes for the UE (for example, set by RRC signaling or an SIB message), when subframes after 4, 5, 6, and 7 from the $n^{th}$ subframe in which the UL grant is received are assigned to the UE, two subframes like a subframe [4,5] and a subframe [6,7] are allocated as one unit group. To express these characteristics, the MSA-start field is set to 0 and 1 and the MSA-length field is set to 2. That is, the MSA-start field is also expressed with an offset based on the unit group. According to an embodiment, the unit group is not explicitly set and one burst unit (DL and UL subframes or UL subframes) may be implicitly determined. In the following embodiments, a description will be made of a case where a basic unit of subframe allocation is 1 subframe.

An HARQ process field may indicate one HARQ process ID or a plurality of HARQ process IDs designated for the allocated UL subframes. To designate a plurality of HARQ process IDs for the allocated UL subframes, in an embodiment, the eNB includes one HARQ process ID in the HARQ process field, and the UE identifies the HARQ process ID indicated by the HARQ process field and a predetermined number of at least one HARQ process IDs following the indicated HARQ process ID and determines to use the HARQ process IDs for the allocated UL subframes. The number of HARQ process ID(s) following the indicated HARQ process ID may be determined based on the MSA-length field.

For example, the eNB sets the HARQ process field to an HARQ process ID #3. If the MSA-length field is 3 and a predetermined basic unit is 1, the UE determines based on the HARQ process field and the MSA-length field that HARQ process IDs #3, #4, and #5 are allocated. In another example, the eNB sets the HARQ process field to the HARQ process ID #3. If the MSA-length field is 3 and a predetermined basic unit is 2, the UE determines based on the HARQ process field and the MSA-length field that HARQ process IDs #3, #4, #5, #6, #7, and #8 are allocated.

In an embodiment, the eNB allocates consecutive HARQ process IDs except for previously used HARQ process ID(s), and the UE identifies newly allocated HARQ process ID(s) except for previously used HARQ process ID(s). For example, if the HARQ process field is set to the HARQ process ID #3, the MSA-length field is 3, and the basic unit is 1, the UE determines that the HARQ process IDs #3, #5, and #6 are allocated if the HARQ process ID #4 has been already used for UL communication between the eNB and the UE.

[When to Perform PUSCH Transmission]

The UE receives a UL grant from the eNB through a PDCCH (or ePDCCH) and transmits UL data through a PUSCH of an UL subframe that is determined in advance or determined according to timing information indicated by the UL grant. The UE determines a position of a resource to be used for transmission of the UL data and physical channel parameters (i.e., transmission parameters) based on the UL grant.

Figure 9:
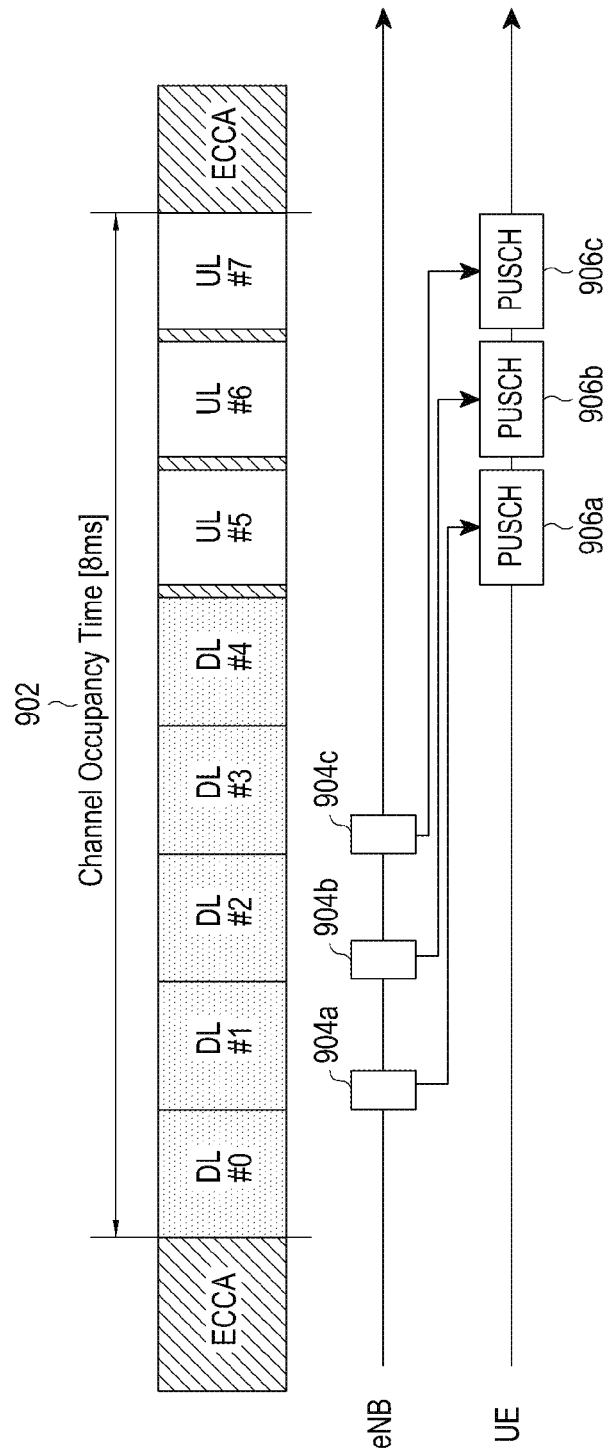
FIG. 9 illustrates a transmission procedure for an UL grant and UL data in an existing LTE system.

FIG. 9 illustrates a transmission procedure for an UL grant and UL data in an existing LTE system.

Referring to FIG. 9, a COT 902 existing after ECCA includes four DL subframes and three UL subframes. A timing offset between a timing when a particular UL grant is received and a timing to transmit UL data is fixed to 4 ms. Thus, to continuously allocate PUSCHs 906a, 906b, and 906c to UL subframes #5, #6, and #7, the eNB transmit UL grants 904a, 904b, and 904c in DL subframes #1, #2, and #3. For example, upon receiving the UL grant 904a in the subframe #1, the UE transmits UL data at a resource position indicated by the UL grant during the subframe #5 through the PUSCH 906a.

Figure 10:
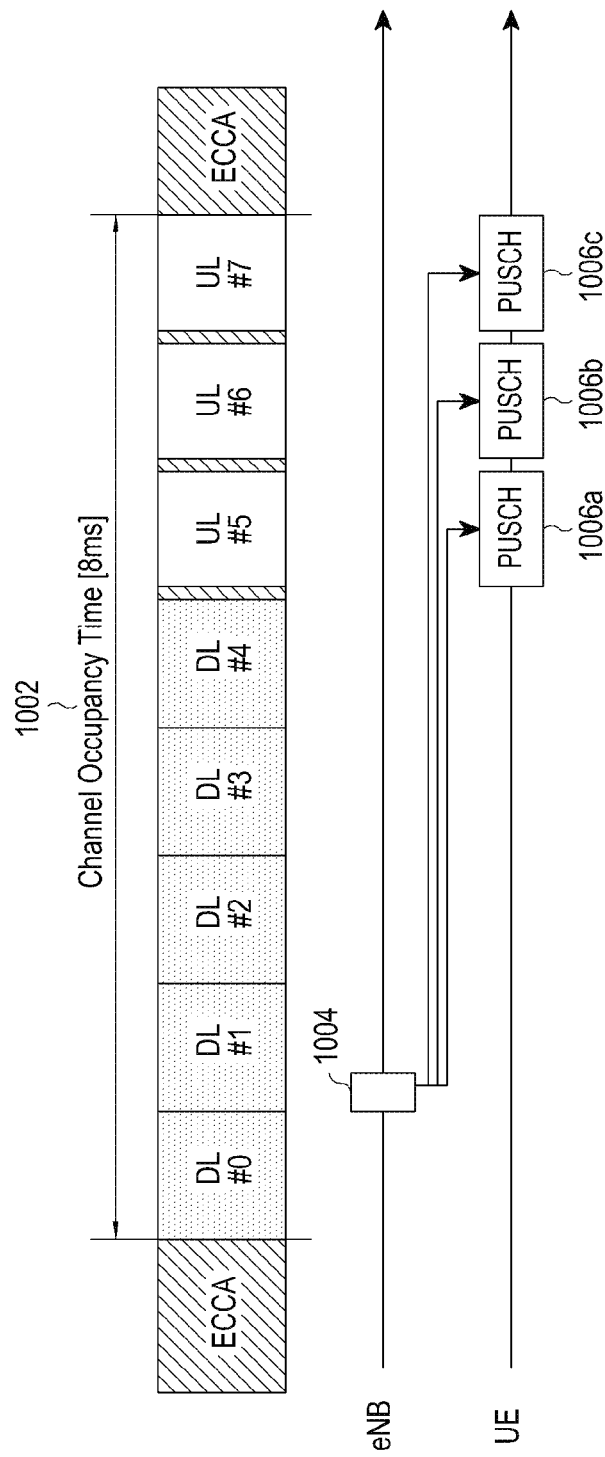
FIG. 10 illustrates a transmission procedure for an UL grant using a timing offset and UL data according to an embodiment of the present disclosure.

FIG. 10 illustrates a transmission procedure for an UL grant using a timing offset and UL data according to an embodiment of the present disclosure.

Referring to FIG. 10, a COT 1002 includes four DL subframes and three UL subframes. A fixed timing offset is not used between a UL grant and UL data. The eNB sets an offset between a timing when the UL grant is received and a timing to transmit the UL data to the UE through the UL grant. In an illustrated example, the UL grant includes a plurality of offsets, e.g., [4,5,6] transmission time intervals (TTIs) or [0,1,2] TTIs, and the UE applies these offsets based on the timing when the UL grant is received to specify UL subframes to which PUSCHs are allocated. The TTI may be set to, for example, 1 ms that is one subframe length. Herein, it is illustrated that one UL grant includes a plurality of offsets for a plurality of PUSCH transmission occasions, but in a modified embodiment, N UL grants that include offsets for N PUSCH transmission occasions, respectively, may be transmitted in one DL subframe. In other embodiments described below, to indicate a plurality of PUSCH transmission occasions, one UL grant or a plurality of UL grants may be transmitted.

In an embodiment, if a start timing of allocated UL subframes is fixed (for example, after 4 ms from the timing when the UL grant is received), then information about the start timing may be omitted from transmission. In an embodiment, the eNB may include a plurality of MSA-length fields and as many MSA-start fields as the MSA-length fields in a UL grant for the UE.

Figure 11:
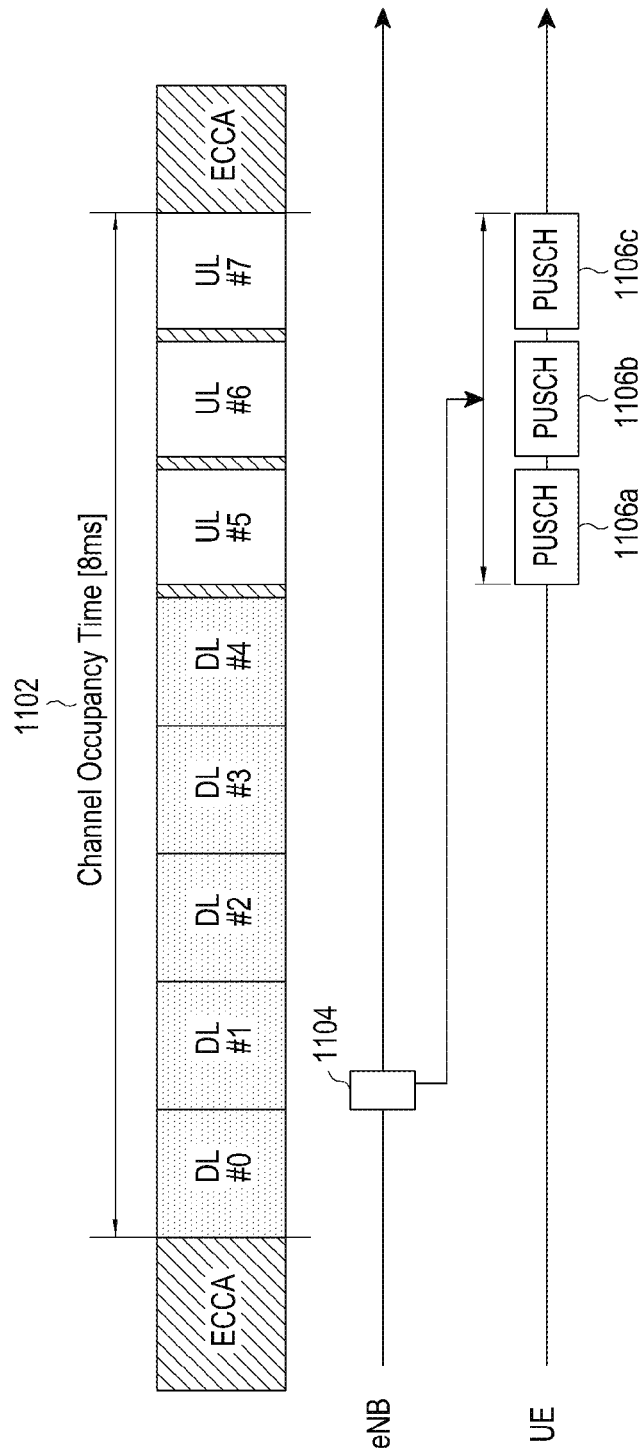
FIGS. 11 and 12 illustrate a transmission procedure for an UL grant indicating a start and an end of consecutive UL subframes and UL data according to an embodiment of the present disclosure.

FIG. 11 illustrates a transmission procedure for an UL grant indicating a start and an end of consecutive UL subframes and UL data according to an embodiment of the present disclosure.

Referring to FIG. 11, a COT 1102 includes five DL subframes and three UL subframes. The eNB indicates a start and an end or a start and a length of continuous UL subframes (i.e., subframes #5, #6, and #7) 1106a, 1106b, and 1106c to which PUSCHs are allocated, by using one UL grant 1104.

In another embodiment, the UL grant 1104 may include at least one of combinations of the following IEs.

a) UE-specific start information & UE-specific end (length) information, b) UE-specific start information & common end (length) information, c) common start information & UE-specific end (length) information, and d) common start information & common end (length) information.

Herein, UE-specific information is applied to a specific UE and common information is applied to any UE receiving the UL grant 1104, common DCI, or a high-layer message. In another embodiment, start and end (length) information of consecutive UL subframes may be assigned to a UE group.

Figure 12:
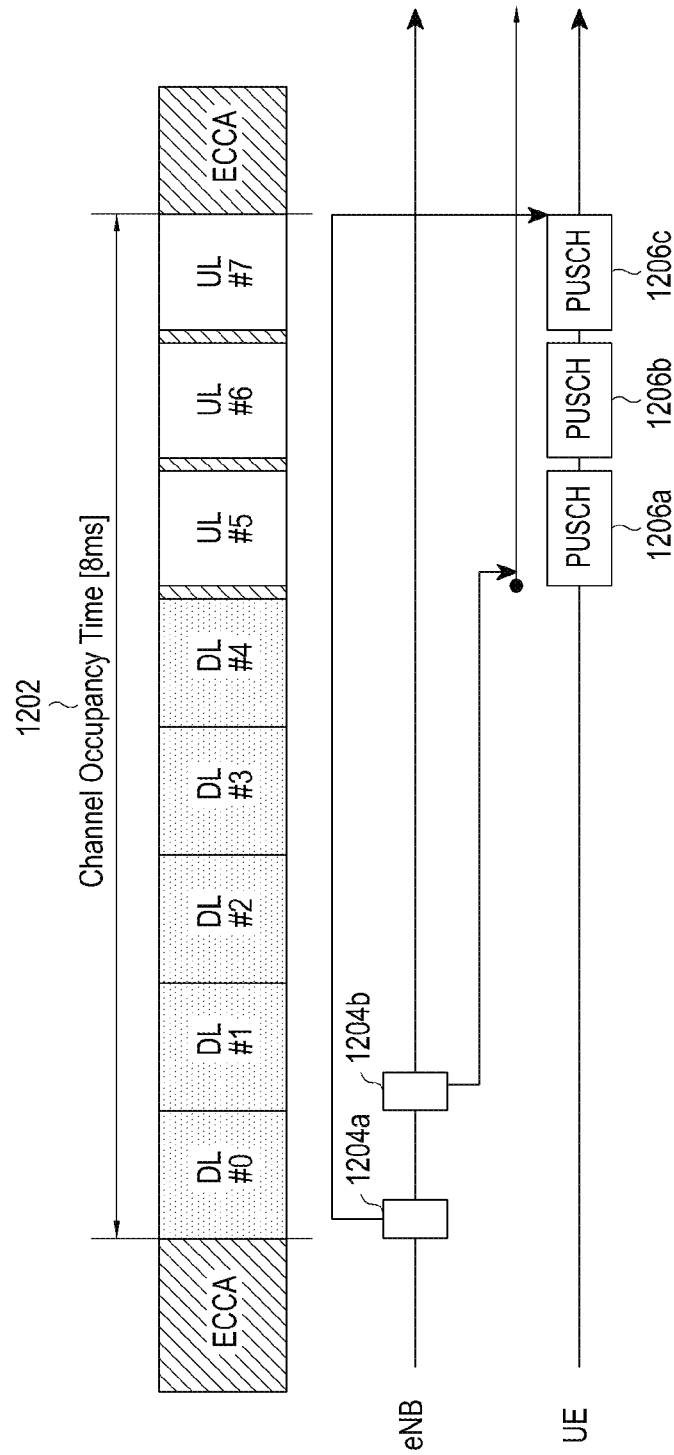

FIG. 12 illustrates a transmission procedure for an UL grant indicating a start and an end of consecutive UL subframes and UL data according to an embodiment of the present disclosure.

Referring to FIG. 12, in a subframe #0 in a COT 1202, an eNB transmits a UL grant 1204a including end (or start) information indicating an end subframe (i.e., a subframe #7) 1206c among the consecutive UL subframes to which the PUSCHs are allocated, and in a subsequent subframe #1, transmits a UL grant 1204b including start (or end, or length) information indicating a first subframe (i.e., a subframe #5). The UE prepares for UL data transmission by receiving the UL grant 1204a, and specifies UL subframes 1206a, 1206b, and 1206c for transmission of UL data by receiving the UL grant 1204b. In another embodiment, the UE determines a position of the end UL subframe based on the UL grant 1204a, and specifies the UL subframes 1206a, 1206b, and 1206c for transmission of UL data simultaneously with preparing for UL data transmission based on the UL grant 1204b.

In various embodiments, start information and end (length) information indicating consecutive UL subframes for transmission of UL data by using an unlicensed band may be notified using i) one grant, ii) two grants, respectively, or iii) one grant and a physical layer (Layer 1, L1) signal (e.g., common/dedicated DCI of a PDCCH). In various embodiments, the end (length) information may be i) determined based on a start timing of start information, ii) determined based on start of a DL burst (consecutive DL subframes), iii) determined based on start of a UL burst (consecutive UL subframes), iv) determined based on a subframe (i.e., a special subframe) where DL-UL switch occurs, v) determined based on a timing when start or end (length) information is transmitted, vi) a subframe index of a PCell, or vii) a subframe index of an SCell. The start and end (length) information may be expressed by combining at least one of the above-described embodiments.

Figure 13:
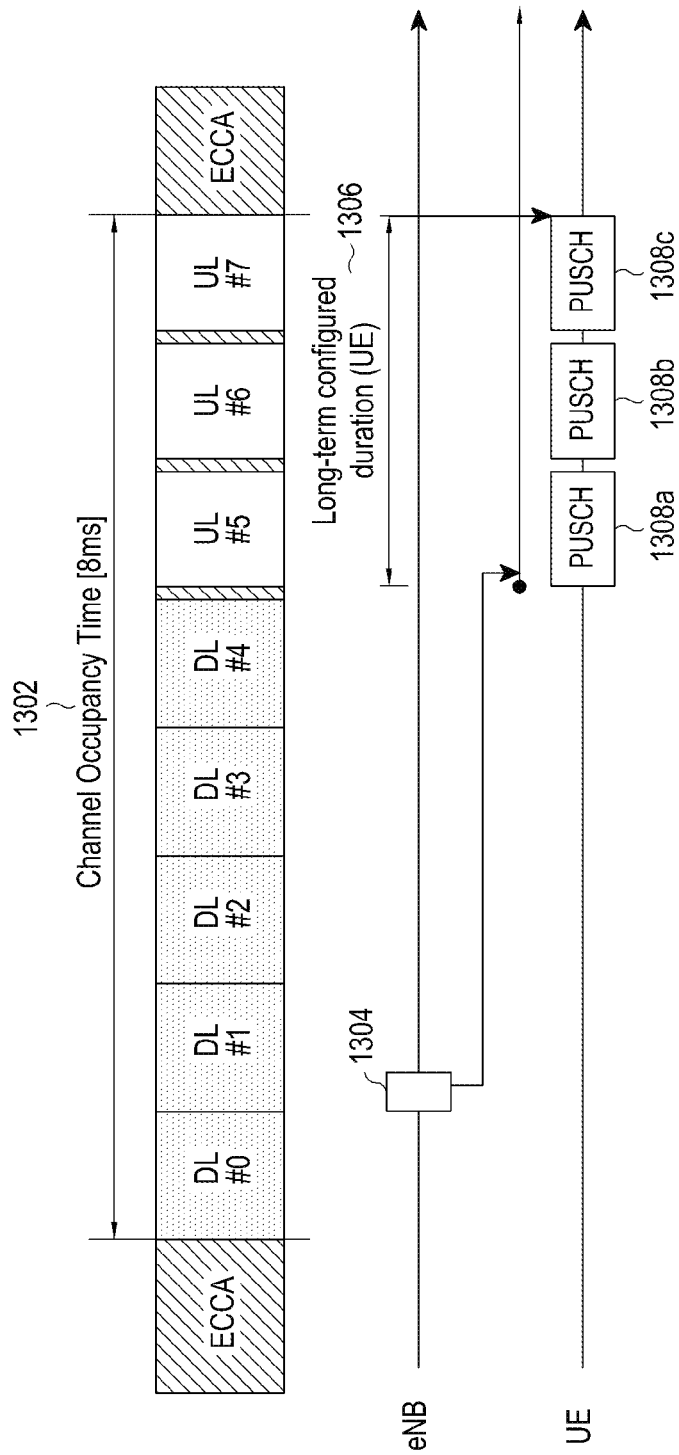
FIGS. 13 and 16 illustrate a transmission procedure for an UL grant semi-statically indicating a start and an end (length) of consecutive UL subframes and UL data according to an embodiment of the present disclosure.
Figure 16:
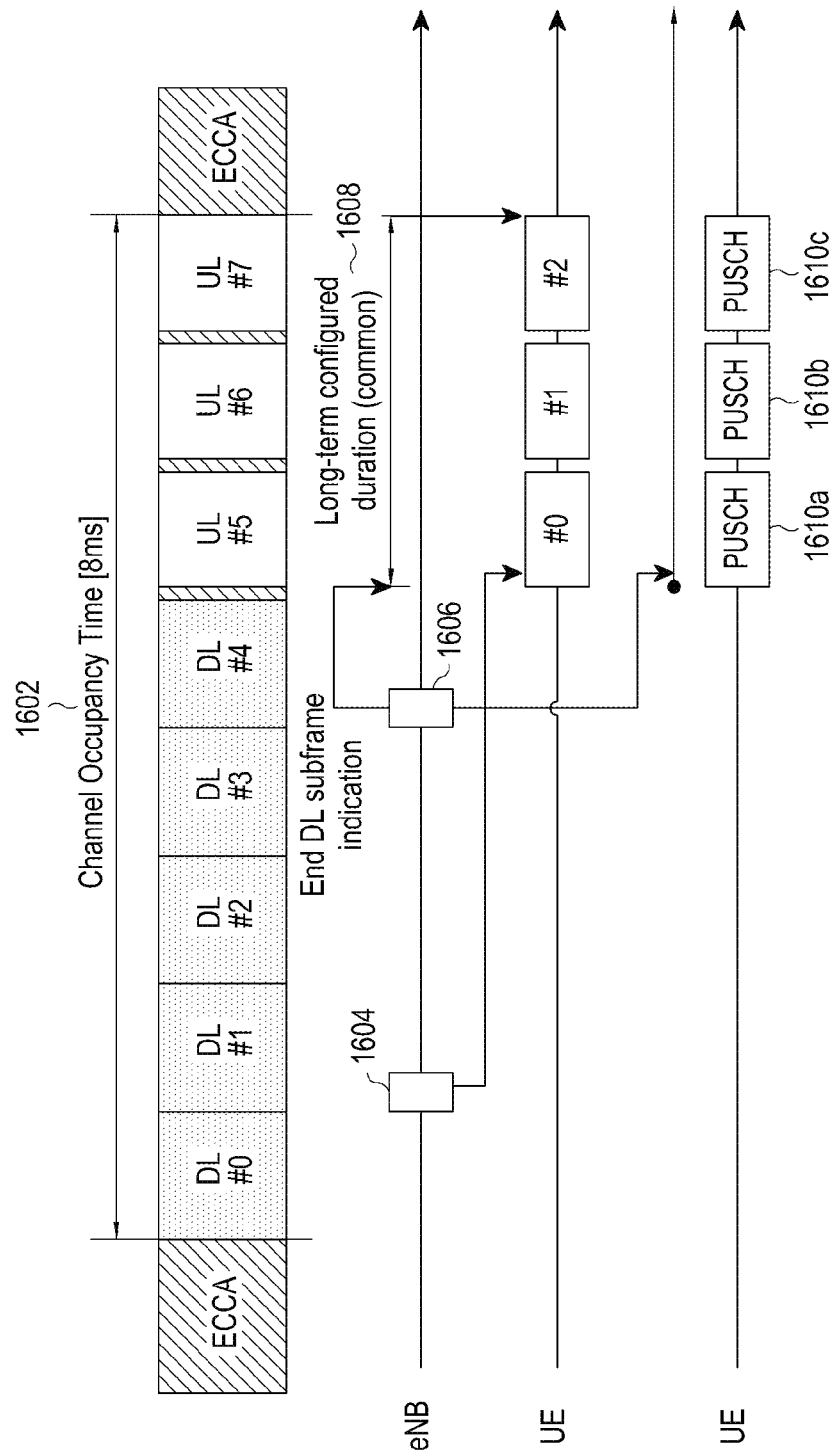

FIGS. 13 and 16 illustrate a transmission procedure for an UL grant semi-statically indicating a start and an end (length) of consecutive UL subframes and UL data according to an embodiment of the present disclosure.

Referring to FIG. 13, in a subframe #1 in a COT 1302, the eNB dynamically notifies the UE of start information about consecutive UL subframes 1308a, 1308b, and 1308c to which PUSCHs are allocated through a UL grant 1304. An end (length) 1308 of the consecutive UL subframes 1308a, 1308b, and 1308c may be semi-statically configured, for example, by RRC signaling, for each UE. The UE specifies the UL subframes 1308a, 1308b, and 1308c for transmission of UL data based on RRC signaling and the UL grant 1304 through PUSCHs in the unlicensed band.

In an embodiment, the UL grant 1304 or a common control signal/message may include one of combinations of the following IEs.

a) UE-specific start information & UE-specific end (length) information, b) UE-specific start information & common end (length) information, c) common start information & UE-specific end (length) information, and d) common start information & common end (length) information.

Herein, UE-specific information is applied to a specific UE (i.e., a scheduled UE) having received a UL grant, and common information is applied to any UE receiving the UL grant 1304 or a common control signal/message. In another embodiment, start and end (length) information of consecutive UL subframes may be allocated to a UE group.

In various embodiments, start information of consecutive UL subframes in which UL data is to be transmitted using the unlicensed band may be notified using i) a grant, ii) an L1 signal (e.g., common/dedicated DCI of a PDCCH), or iii) a medium access control (MAC) control element (CE). In various embodiments, the end information of the consecutive UL subframes may be notified using i) an MAC CE, ii) RRC signaling, iii) a high-layer control signal of a data region, or iv) an SIB of a broadcast channel (BCH).

In various embodiments, the start information may be determined based on i) a timing to transmit a grant, ii) a timing of a PCell, or iii) a start of a DL burst (consecutive DL subframes) of an SCell.

In various embodiments, the end (length) information may be i) determined based on a start timing indicated by the start information, ii) determined based on start of a DL burst (consecutive DL subframes), iii) determined based on start of a UL burst (consecutive UL subframes), iv) determined based on a subframe where DL-UL switch occurs, or v)

determined based on a timing when the start information is transmitted. The start and end (length) information may be expressed by combining at least one of the above-described embodiments.

Figure 14:
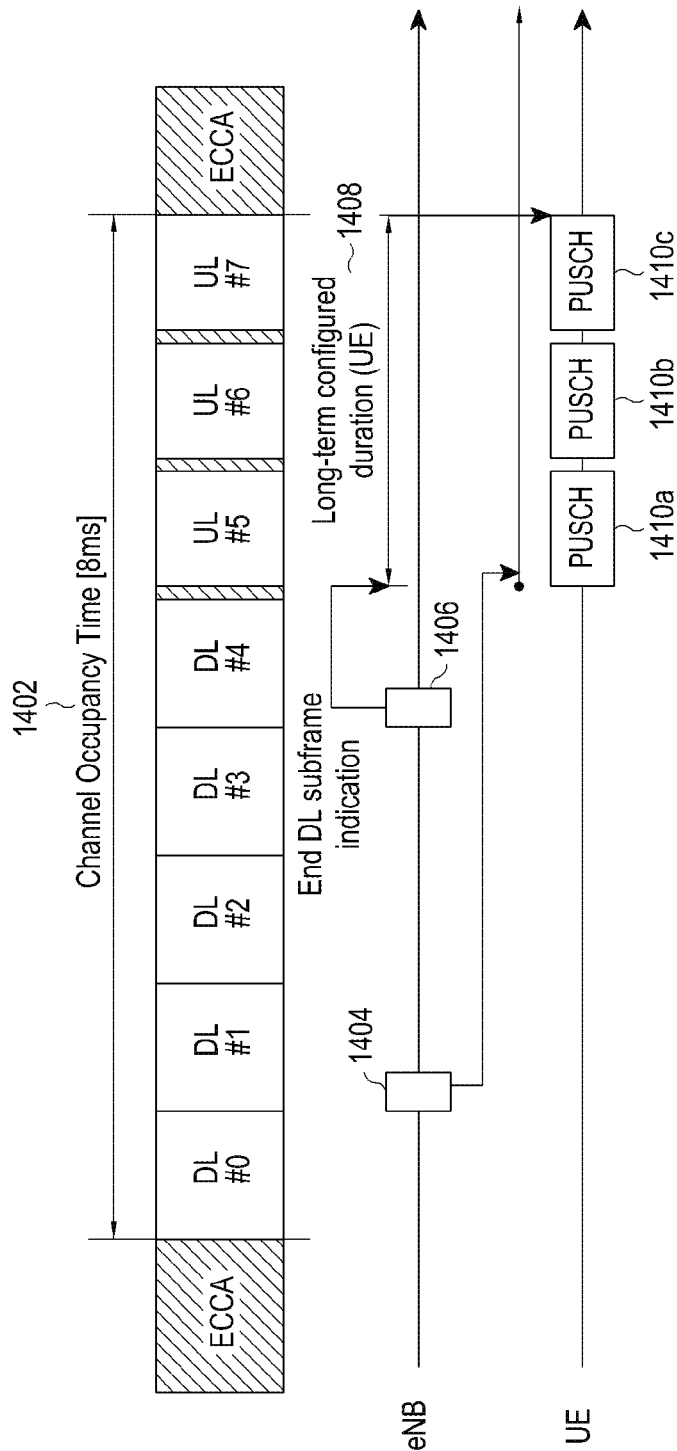

Referring to an example of FIG. 14, a UL grant 1404 transmitted in a subframe #1 in a COT 1402 includes start information about consecutive UL subframes 1410a, 1410b, and 1410c to which PUSCHs are allocated. A start (length) 1408 of the consecutive UL subframes 1410a, 1410b, and 1410c is set in common for UEs through a common L1 signal 1406, e.g., common DCI or SIB of a PDCCH. The UE receives the common L1 signal 1406 and the UL grant 1404 and specifies the UL subframes 1410a, 1410b, and 1410c for transmission of UL data through PUSCHs in the unlicensed band.

Figure 15:
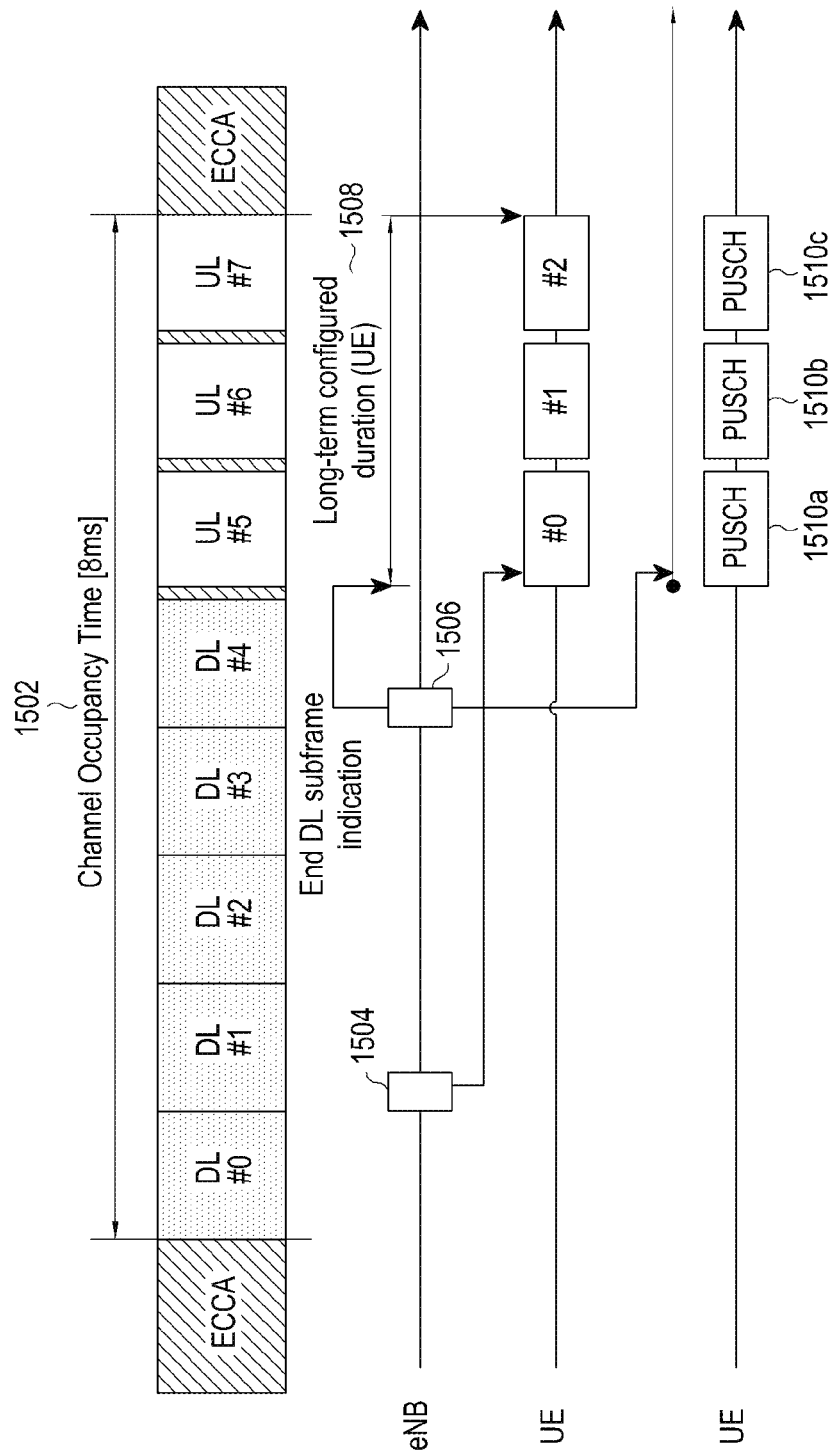

Referring to an example of FIG. 15, start information about consecutive UL subframes 1510a, 1510b, and 1510c to which PUSCHs are allocated is indicated by an L1 signal 1506 that is common to the UEs, e.g., common DCI indicating an end DL subframe in a COT 1502, and a length 1508 of the consecutive subframes 1510a, 1510b, and 1510c is set for each UE through RRC signaling. The UE receives the common L1 signal 1506 and RRC signaling and specifies the UL subframes 1510a, 1510b, and 1510c for transmission of UL data through PUSCHs in the unlicensed band.

In this case, a UL grant 1504 transmitted in a subframe #1 in the COT 1502 includes transmission parameters (e.g., an MCS index, an HARQ process ID, etc.) for UL data of the consecutive UL subframes 1510a, 1510b, and 1510c. The UE specifies the UL subframes 1510a, 1510b, and 1510c by applying UE-specific length information given through the RRC signaling based on the first UL subframe (i.e., a subframe #5) following the end DL subframe (i.e., a subframe #4) indicated by the common DCI, and configures UL data to be transmitted through the UL subframes 1510a, 1510b, and 1510c based on the UL grant 1504.

Referring to an example of FIG. 16, start information about consecutive UL subframes 1610a, 1610b, and 1610c to which PUSCHs are allocated is indicated by an L1 signal 1606 that is common to the UEs, e.g., common DCI indicating an end DL subframe in a COT 1602, and a length 1608 of the consecutive subframes 1610a, 1610b, and 1610c is set in common through the L1 signal or the SIB.

Similarly with the example of FIG. 15, a UL grant 1604 transmitted in a subframe #1 includes transmission parameters (e.g., an MCS index, an HARQ process ID, etc.) for UL data of the consecutive UL subframes 1610a, 1610b, and 1610c. The UE specifies the UL subframes 1610a, 1610b, and 1610c by applying common length information given through the L1 signal or SIB based on the first UL subframe (i.e., a subframe #5) following the end DL subframe (i.e., a subframe #4) indicated by the common DCI, and configures UL data to be transmitted through the UL subframes 1610a, 1610b, and 1610c based on the UL grant 1604.

In an embodiment, the common length information is given by the L1 signal or SIB, but may be determined based on a COT 1602 indicating the number of DL and UL subframes (i.e., a total length of DL and UL bursts) or the number of UL subframes (i.e., a length of an UL burst). For example, if a length of a UL burst is given as 3, the UE may determine three subframes from the first UL subframe, that is, subframes #5, #6, and #7 as transmission resources in which UL data is to be transmitted in an unlicensed band.

In an embodiment, the eNB semi-statically notifies the UE of start information and end (length) information about consecutive UL subframes which are to use the unlicensed band. The UE transmits UL data during the notified UL subframes through the unlicensed band.

In various embodiments, the start and end (length) information may be configured as follows;

a) UE-specific start information & UE-specific end (length) information, b) UE-specific start information & common end (length) information, c) common start information & UE-specific end (length) information, or d) common start information & common end (length) information.

Herein, UE-specific information is applied to a specific UE and common information is applied to any UE receiving the start and end (length) information. In another embodiment, start and end (length) information may be assigned to a UE group.

In various embodiments, the start information or end (length) information may be notified using i) an MAC CE, ii) RRC signaling, iii) a high-layer control signal of a data region, or iv) an SIB of a BCH.

In various embodiments, the start information may be determined based on i) a timing to transmit a control signal indicating the start information, ii) a timing of a PCell, or iii) start of a DL burst (consecutive DL subframes) of an SCell.

In various embodiments, the end (length) information may be i) determined based on a start timing indicated by the start information, ii) determined based on start of a DL burst (consecutive DL subframes), iii) determined based on start of a UL burst (consecutive UL subframes), iv) determined based on a subframe where DL-UL switch occurs, or v) determined based on a timing when the start information is transmitted. The start and end (length) information may be expressed by combining at least one of the above-described embodiments.

[When to Perform LBT]

The UE has to perform and succeed in LBT before the eNB transmits UL data through PUSCHs in a plurality of UL subframes indicated by a UL grant. Hereinbelow, various embodiments for determining a timing to perform LBT (hereinafter, referred to as an LBT timing) will be described. Depending on a structure of CCA, a CCA period may in a start part of the first subframe (i.e., start of a PUSCH period) in which UL data may be transmitted, or may be in an end part of a subframe immediately before a subframe in which UL data may be transmitted.

In an embodiment, the UE performs LBT before every allocated UL subframe. For example, the UE receives a UL grant in an $n^{th}$ subframe and receives instructions for PUSCH transmission from an $(n+m)^{th}$ subframe to an $(n+m+3)^{th}$ subframe by the UL grant. The UE then performs LBT in a CCA period immediately before every PUSCH transmission subframe. For example, the UE may perform LBT in a CCA period situated in a part of a $(n+m-1)^{th}$ subframe to determine transmission in a $(n+m)^{th}$ subframe. If the UE succeeds in LBT, UL data transmission in one UL subframe is allowed. Next, the UE resumes LBT for transmission in the next UL subframe.

In an embodiment, the UE may perform transmission without LBT during N consecutive UL subframes if succeeding in LBT once. That is, LBT is performed once every N subframes among allocated UL subframes. The value N is semi-statically indicated to the UE by the eNB through an MAC CE, RRC signaling, or a high-layer message. The UE determines an LBT timing having a period N based on at least one of the following criterions:

a) a timing when a UL grant is received,
b) a start timing of a UL burst,
c) a start timing of a DL burst, and
d) a start timing of a frame of a PCell.

In an embodiment, the eNB may transmit a dynamic control signal indicating a UL subframe in which LBT has to be performed. The dynamic control signal may be, for example, at least one of a UL grant and common/dedicated L1 signaling. The indication information of the UL subframe in which LBT has to be performed may be determined based on a predetermined reference timing. The reference timing may be, for example, a timing when a UL grant including the indication information is received, a timing when L1 signaling including the indication information is received, a start timing of a UL burst, a start timing of a DL burst, and a start timing of a frame of PCell. The UE determines an LBT timing based on the reference timing or the first LBT timing deduced from the reference timing by using the following indication information included in the dynamic control signal.

In various embodiments, the indication information may be configured as follows;
a) the number of UL subframes in which UL data may be continuously transmitted without performing LBT,
b) a period in which LBT is to be performed (may be expressed as the number of subframes),
c) information indicating subframe(s) in which LBT has to be performed and information indicating subframe(s) in which LBT is not performed (for example, may be a subframe index or a bitmap), and
d) a position of the next subframe in which LBT has to be performed (for example, may be a subframe index or an offset).

[Which HARQ Process ID is to be Transmitted]

At least one UL grants related to a plurality of UL subframes that may be used to transmit UL data in an unlicensed band are transmission parameters regarding the plurality of UL subframes, and include frequency resource allocation information, an MCS index, and HARQ-related information. Herein, the HARQ-related information may include an RV and an HARQ process ID allocated for each UL subframe. At least one of transmission-related information except for information indicating an allocated subframe in an existing UL grant may be notified through an M-UL grant or a high-layer message (e.g., RRC signaling). When a high-layer message is used, the UE may be allowed to reuse identical resource allocation and HARQ information a specific number of times within a predetermined time or in periodic positions. However, when transmission using one HARQ process ID is completed, the next HARQ process ID has to be used in a predetermined order. According to an embodiment, when an M-UL grant is used, the eNB may indicate subframe(s) for PUSCH transmission by using the coming earliest DL burst or the earliest end DL subframe as a reference. According to another embodiment, if a position of a UL subframe to which the HARQ process ID designated by the M-UL grant becomes different from a position indicated by the M-UL grant, then previous time information needs to be overwritten.

FIGS. 17 through 21 illustrate HARQ process IDs that are set for a plurality of subframes according to an embodiment of the present disclosure.

Figure 17:
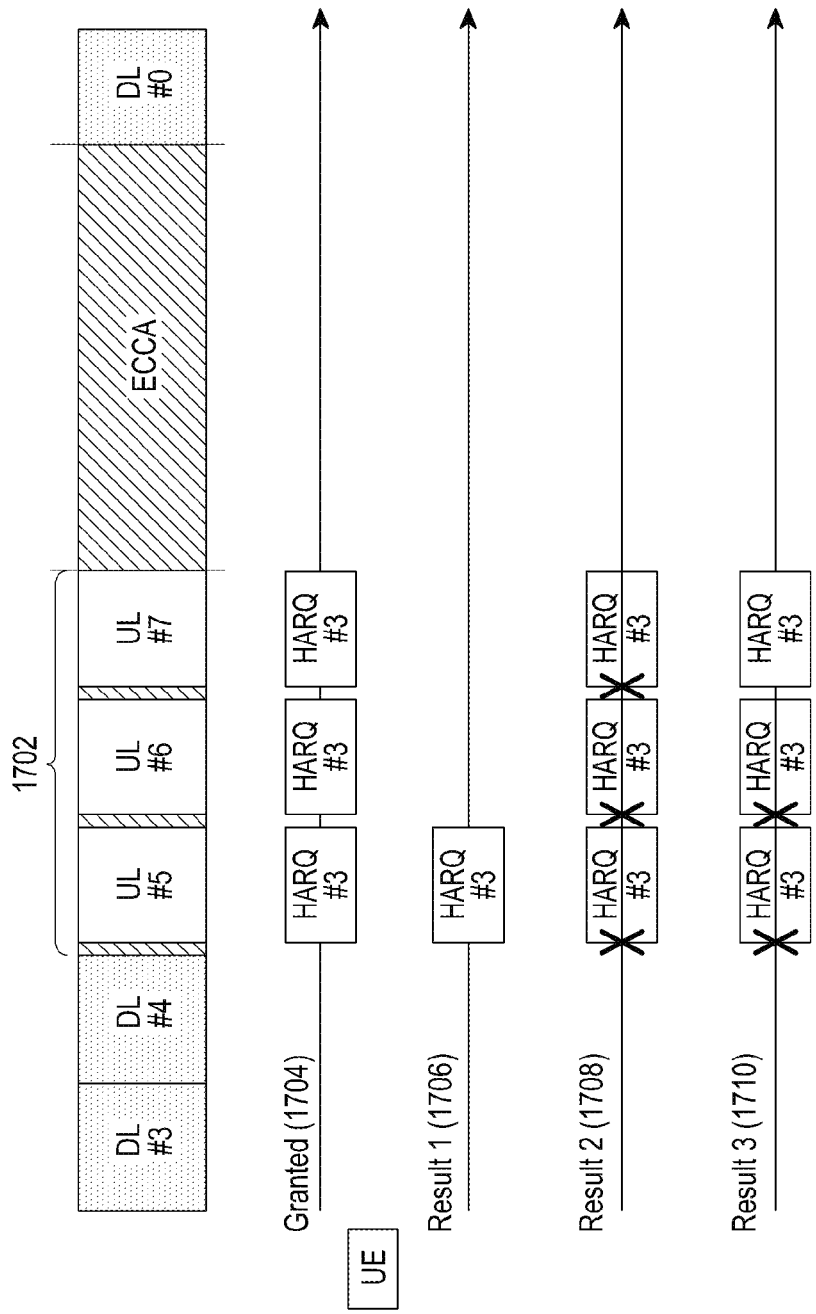
FIGS. 17 through 21 illustrate hybrid automatic repeat request (HARQ) process identifiers (IDs) that are set for a plurality of subframes according to an embodiment of the present disclosure.

Referring to FIG. 17, the eNB allocates an identical HARQ process ID (#3 in the illustrated example) for a plurality of UL subframes 1702 by using UL grant(s) (1704), and the HARQ process ID is fixed during the plurality of UL subframes 1702. The UE interprets resource positions to which the HARQ process ID is applied as being fixed, and in case of an LBT failure, there is no chance to reattempt LBT. In the illustrated example, if the UE succeeds in LBT during a CCA period immediately before the first UL subframe (that is, the subframe #5) (1706), the UE transmits UL data during the subframe #5 by using the HARQ process ID #3. If the UE fails in LBT for all of the allocated UL subframes (that is, the subframes #5, #6, and #7) (1708), the UE has no transmission occasion of UL data. If the UE fails in LBT for the first two UL subframes (i.e., the subframes #5, #6, and #7) and succeeds in LBT for the end UL subframe (i.e., the subframe #7) (1710), the UE transmits UL data in the subframe #7. In an embodiment, the UE transmits the same data through an extra allocated resource without completing transmission after succeeding in LBT with respect to the subframe #5, thereby applying HARQ TTI bundling that improves reception performance of the eNB.

Figure 18:
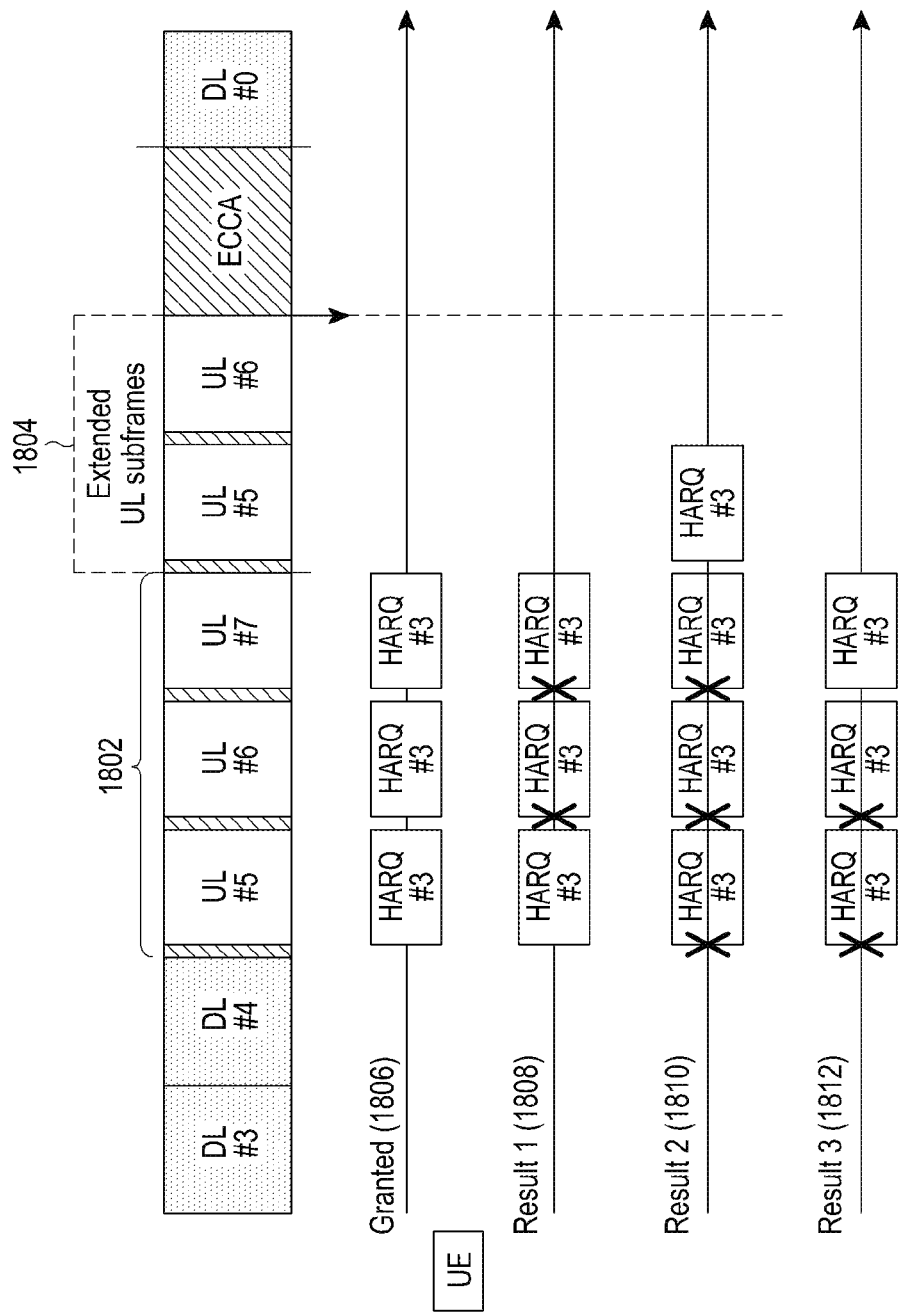

Referring to FIG. 18, the eNB allocates an identical HARQ process ID (#3 in the illustrated example) for a plurality of UL subframes 1802 by using UL grant(s) (1806), but the HARQ process ID is not fixed only for the plurality of UL subframes 1802. The UE may reattempt LBT for a resource of a subsequent subframe in case of an LBT failure.

If the UE succeeds even only once in the plurality of allocated UL subframes 1802 (1808), the UE does not perform additional transmission in the plurality of allocated UL subframes 1802. If the UE fails to succeed in all LBT for the plurality of allocated UL subframes 1802 (1810) and the eNB informs the UE of extended UL subframes 1804 in advance, then the UE may reattempt LBT for at least one of the extended UL subframes 1804. For example, if a maximum allowed length of DL and UL bursts is 8 ms and the allocated DL and UL bursts are 6 ms, then additional 2 ms is allowed as the extended UL subframes 1804. To this end, the eNB notifies the UE of a maximum allowed length of a COT used in the current burst or particular period by using L1 signal or RRC signaling.

In an embodiment, the UE may use, as a separate UL burst, extended UL subframes after the maximum allowed length of the DL and UL bursts, 8 ms. To access a resource for the separate UL burst, the UE may use LBT in Category 4 of LTE instead of Category 2 of LTE.

If the UE fails in all LBT in the allocated UL subframes 1802 (1810), then the UE determines whether at least one extended UL subframe 1804 exist based on the maximum allowed length. If there is at least one extended UL subframe 1804, the UE reattempts LBT for the extended UL subframe 1804.

If the UE fails in LBT for the first two allocated UL subframes (i.e., the subframes #5, #6) and succeeds in LBT for the end UL subframe (i.e., the subframe #7) (1812), the UE transmits UL data in the subframe #7, and the extended UL subframes 1804 are not used.

Figure 19:
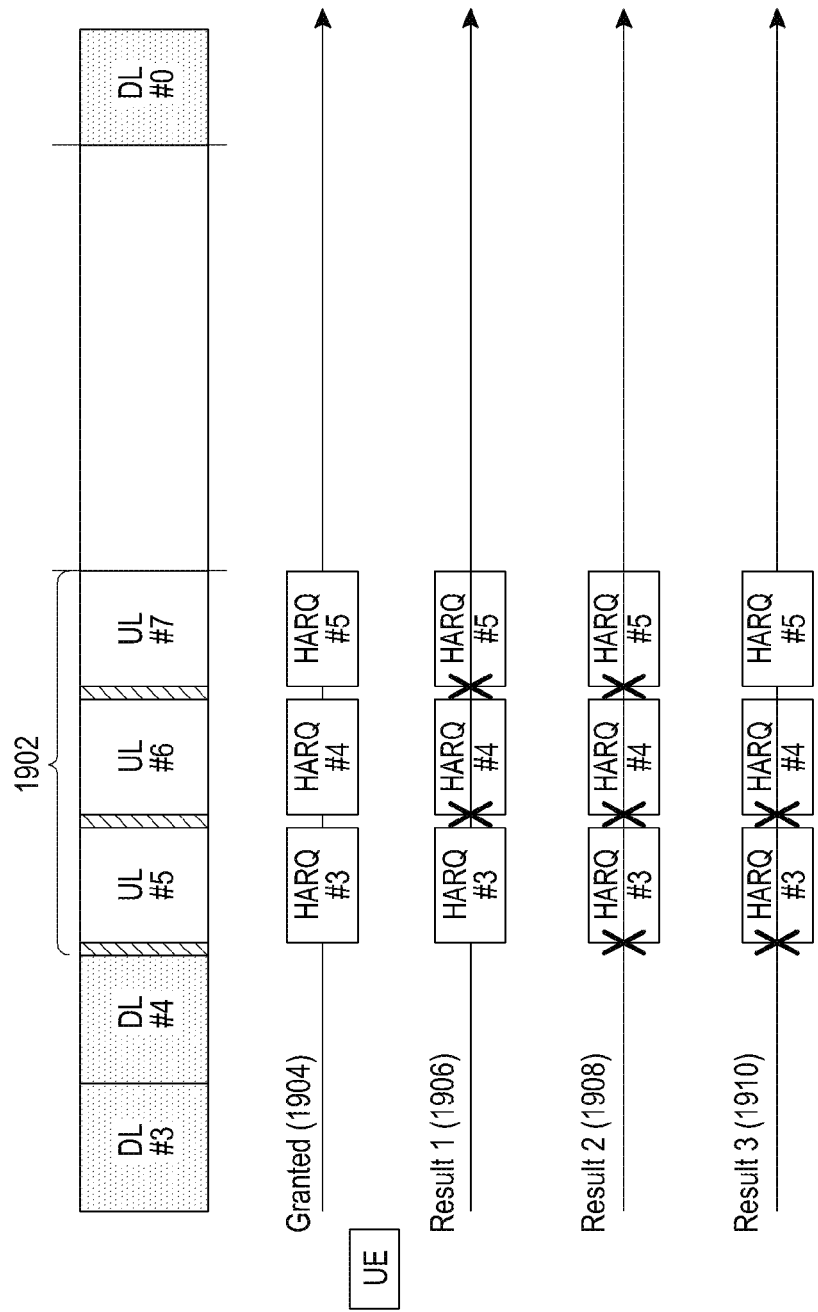

Referring to FIG. 19, the eNB assigns a plurality of different HARQ process IDs (#3, #4, and #5 for a plurality of UL subframes 1902) (1904). The UE interprets resource positions to which the HARQ process IDs are applied as being fixed, and has no occasion of reattempt in case of an LBT failure. In the illustrated example, if the UE succeeds in LBT during a CCA period immediately before the first UL subframe (that is, the subframe #5) (1906), the UE transmits UL data during the subframe #5 by using the HARQ process ID #3, but fails in LBT in subsequent subframes #6 and #7 and thus may not transmit other HARQ process IDs #4 and #5. If the UE fails in LBT for all of the allocated UL subframes (that is, the subframes #5, #6, and #7) (1908), the UE has no transmission occasion of UL data of the HARQ process IDs #3, #4, and #5. If the UE fails in LBT for the first two UL subframes (i.e., the subframes #5, #6) and succeeds in LBT for the end UL subframe (i.e., the subframe #7) (1910), the UE transmits UL data of the HARQ process ID #5 in the subframe #7, and transmission of UL data of the HARQ process IDs #3 and #4 are abandoned.

Figure 20:

Referring to FIG. 20, the eNB allocates a plurality of different HARQ process IDs (#3, #4, #5 in the illustrated example) for a plurality of UL subframes 2002 by using UL grant(s) (2006), but the HARQ process IDs are not fixed only for the plurality of UL subframes 2002. The UE may reattempt LBT for a resource of a subsequent subframe in case of an LBT failure. In case of reattempt to LBT, the UE uses a UL grant for UL data for which LBT fails with respect to a previous UL subframe, that is, an HARQ process ID. If LBT succeeds, the UE transmits UL data by using an UL grant for subsequent next UL data, that is, an HARQ process ID. The above-described operation is performed in the plurality of allocated UL subframes 2002 or may be performed during an extended UL subframe(s) 2004 additionally allocated by the eNB.

Once succeeding in LBT with respect to the allocated first UL subframe (i.e., the subframe #5) (2008), then the UE transmits UL data of the HARQ process ID #3 in the subframe #5. If failing in an LBT attempt for the next UL subframe (i.e., the subframe #6), then the UE reattempts LBT to transmit UL data of the HARQ process ID #4 in the next UL subframe (i.e., the subframe #7). If failing in all LBT for the UL subframes (i.e., the subframes #6, #7), then the UE reattempts LBT for the subsequent first extended UL subframe 2004, and if succeeding in LBT, the UE transmits UL data by using the HARQ process ID #4. Likewise, the UE succeeds in LBT for the second extended UL subframe 2004 and transmits UL data by using the HARQ process ID #5.

If failing in all LBT for the allocated UL subframes (i.e., the subframes #5, #6, #7) (2010), then the UE reattempts LBT for the subsequent first extended UL subframe (i.e., the subframe #5) 2004, and if succeeding in LBT, the UE transmits UL data of the HARQ process ID #3. Next, the UE succeeds in LBT for the second extended UL subframe (i.e., the subframe #6) 2004 and transmits UL data by using the HARQ process ID #4 of the subframe #6. There is no extended UL subframe anymore, so the UE has no transmission occasion for the HARQ process ID #5.

Since failing in all LBT for the allocated first and second UL subframes (i.e., the subframes #5, #6) (2012) and succeeding in LBT for the allocated end UL subframe (i.e., the subframe #7), the UE may transmit UL data of the HARQ process ID #3. Since there is an HARQ process ID that is not yet used, the UE attempts LBT for the subsequent first extended UL subframe 2004, and if succeeding in LBT, the UE transmits UL data by using the HARQ process ID #4. Next, the UE succeeds in LBT for the second extended UL subframe 2004 and transmits UL data by using the HARQ process ID #5.

As shown in FIG. 20, if the UE transmits UL data by using an HARQ process ID that is different from an HARQ process ID indicated by the eNB in a particular subframe, that is, an HARQ process ID failing to be transmitted in a previous subframe due to an LBT failure, the eNB needs to identify a changed HARQ process ID in the corresponding subframe. For example, the UE changes a cyclic shift of a DMRS sequence according to a determined rule and transmits UL data by using the changed cyclic shift. The eNB detects the cyclic shift changed according to the determined rule while receiving the UL data, and may know from the detected cyclic shift how many times the UE fails in LBT or how many HARQ process IDs among HARQ process IDs allocated in the UL grant are dropped. If the UE obtains a UL resource and transmits UL data, the eNB may receive UL data by using HARQ process IDs having the same order as allocated in the UL grant.

Figure 21:
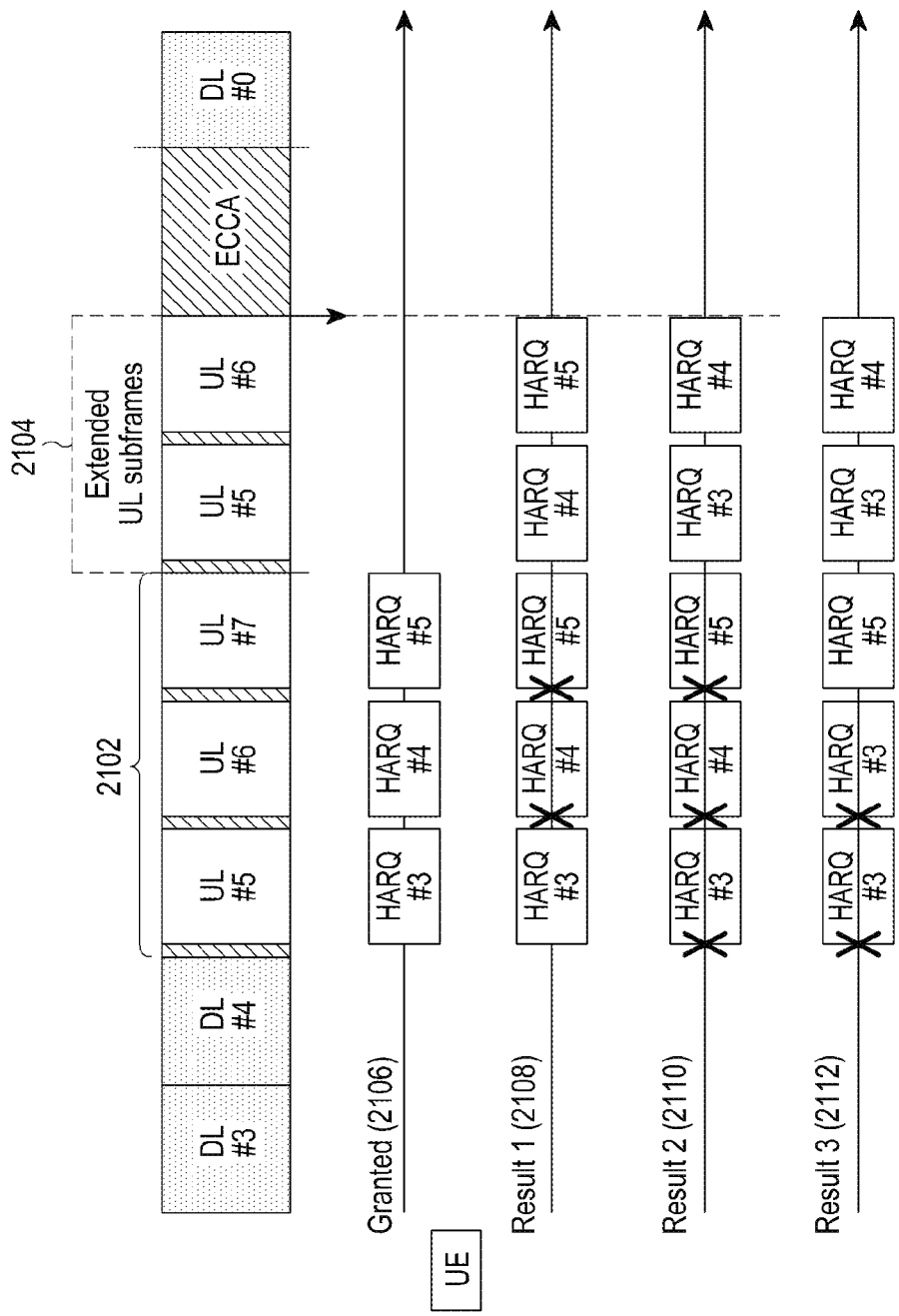

Referring to FIG. 21, the eNB allocates a plurality of different HARQ process IDs (#3, #4, #5 in the illustrated example) for a plurality of UL subframes 2102 by using UL grant(s) (2106), but the HARQ process IDs are fixed for the plurality of UL subframes 2102. The UE may reattempt LBT for a resource of a subsequent subframe in case of an LBT failure. In case of the LBT failure, the UE does not reattempt transmission of UL data of an identical HARQ process ID in a subsequent resource. If succeeding in LBT, the UE transmits UL data according to an UL grant for a next HARQ process ID. The above-described operation is performed in the plurality of allocated subframes 2102 or may be performed during an extended UL subframe(s) 2104 additionally allocated by the eNB. The UE may reattempt transmission of UL data in the most preceding HARQ process ID for which LBT fails in the extended UL subframe 2104. Herein, the most preceding HARQ process ID means the smallest value when HARQ process IDs are aligned in an order of subframe indices allocated to the HARQ process IDs in an UL grant or in an order of the HARQ process IDs.

Once succeeding in LBT with respect to the allocated first UL subframe (i.e., the subframe #5) (2108), then the UE transmits UL data of the HARQ process ID #3 in the subframe #5. If failing in an LBT attempt for the next UL subframe (i.e., the subframe #6), then transmission of UL data of the HARQ process ID #4 is abandoned and the UE reattempts LBT to transmit UL data of the HARQ process ID #5 in the next UL subframe (i.e., the subframe #7). If failing in all LBT for the UL subframes (i.e., the subframes #6 and #7), then the UE reattempts LBT for the subsequent first extended UL subframe 2104, and if succeeding in LBT, the UE transmits UL data in the first extended UL subframe 2104 by using the most preceding HARQ process ID (i.e., #4) for which transmission fails. Likewise, the UE succeeds in LBT for the second extended UL subframe 2004 and transmits UL data by using the HARQ process ID #5.

If failing in all LBT for the allocated UL subframes (i.e., the subframes #5, #6, and #7) (2110), then the UE reattempts LBT for the subsequent first extended UL subframe 2104, and if succeeding in LBT, the UE transmits UL data of the most preceding HARQ process ID (i.e., #3) for which transmission fails in the first extended UL subframe 2104. Next, the UE succeeds in LBT in the second extended UL subframe 2104 and fails in transmission, and then transmits UL data of the next HARQ process ID (i.e., #4) in the second extended UL subframe 2104. Since there is no extended UL subframe any more, the UE has no transmission occasion for the HARQ process ID #5.

Because of failing in all LBT in the allocated first and second UL subframes (i.e., the subframes #5 and #6) (2112) and succeeding in LBT in the allocated end UL subframe (i.e., the subframe #7), the UE may transmit UL data of the HARQ process ID #5. Since there are HARQ process IDs that are not yet used, the UE attempts LBT for the subsequent first extended UL subframe 2104, and if succeeding in LBT, the UE transmits UL data by using the HARQ process ID #3. Next, the UE succeeds in LBT for the second extended UL subframe 2104 and transmits UL data by using the HARQ process ID #4.

As shown in FIG. 21, if the UE transmits UL data for an HARQ process ID that is different from an HARQ process ID indicated by the eNB in a particular extended UL subframe, that is, an HARQ process ID failing to be transmitted in an originally allocated UL subframe, the eNB needs to identify a changed HARQ process ID in the corresponding extended UL subframe. For example, the eNB receives retransmission of UL data by using the most preceding HARQ process ID among HARQ process ID(s) for which transmission fails in a non-extended UL subframe(s).

Figure 22:
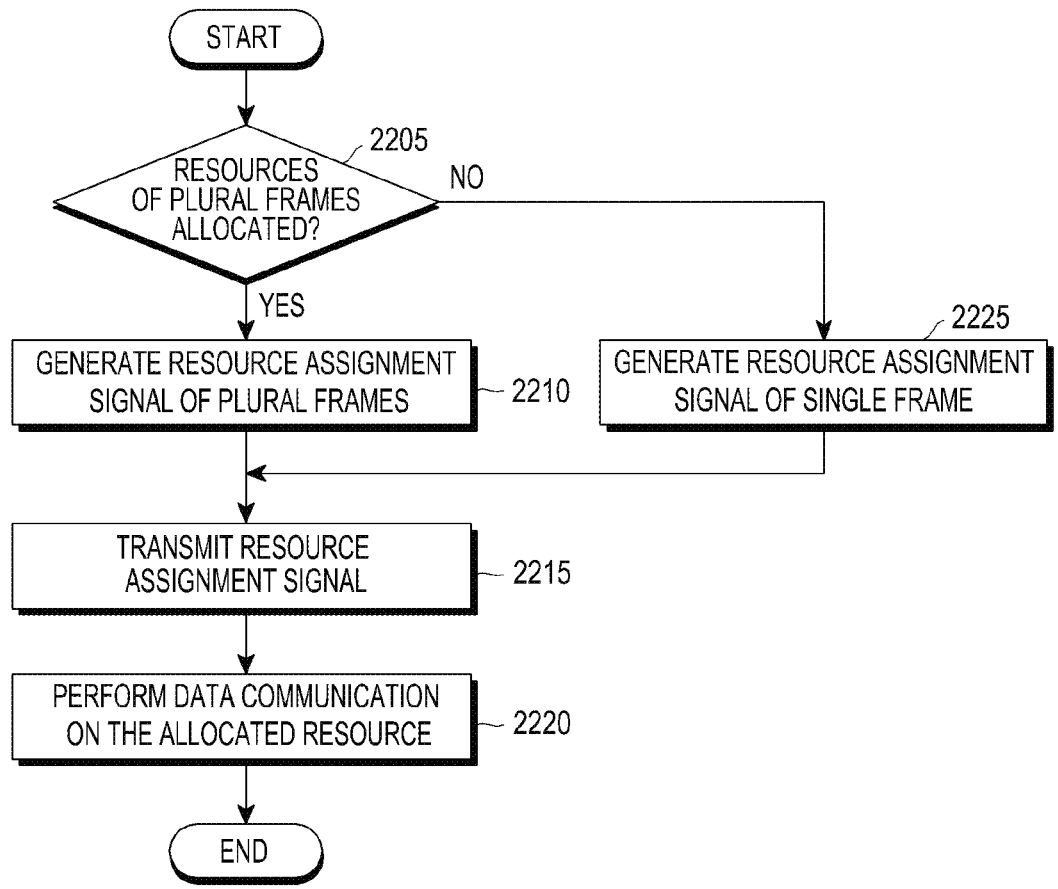
FIG. 22 is a flowchart illustrating operations of an evolved NodeB (eNB) for performing plural-frame resource allocation according to an embodiment of the present disclosure.

FIG. 22 is a flowchart illustrating operations of an eNB for performing plural-frame resource allocation according to an embodiment of the present disclosure.

Referring to FIG. 22, in operation 2205, the eNB determines whether to allocate a resource of a plurality of subframes (or frames) to the UE to support UL transmission in an unlicensed band. If determining to allocate a resource of a plurality of subframes, the eNB generates a resource assignment signal indicating resource allocation for a resource of a plurality of subframes in operation 2210. On the other hand, if determining that there is no need to allocate a resource of a plurality of subframes, the eNB generates a resource assignment signal indicating resource allocation for a resource of a single subframe in operation 2225. In operation 2215, the eNB transmits the resource assignment signal to the UE through at least one UL grant or other control signal. Transmission of the resource assignment signal may be performed by at least one of the above-described embodiments. The eNB may also transmit additional information needed for the UE to transmit UL data by using the unlicensed band, e.g., start information and/or end(length) information and transmission parameters through an UL grant or other control signal. In operation 2220, the eNB receives UL data from the UE through the unlicensed band during subframe(s) assigned based on the transmitted information.

Figure 23:
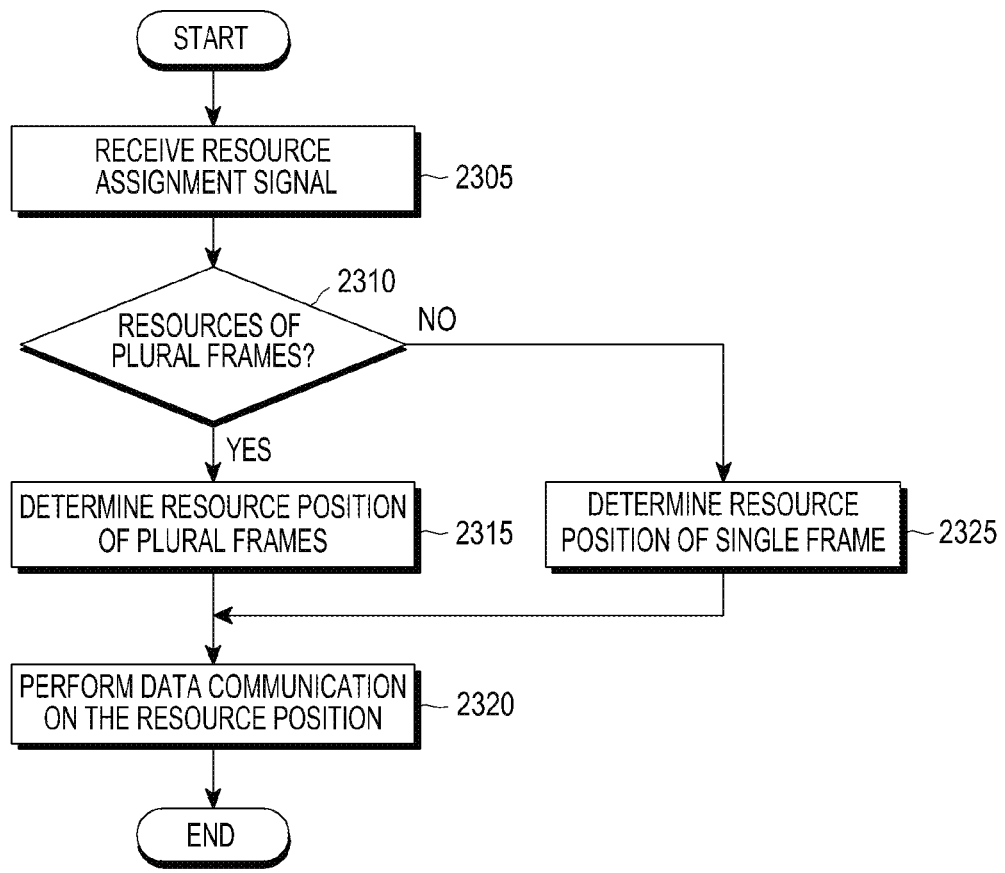
FIG. 23 is a flowchart illustrating operations of a user equipment (UE) for receiving plural-frame resource allocation according to an embodiment of the present disclosure.

FIG. 23 is a flowchart illustrating operations of a UE for receiving plural-frame resource allocation according to an embodiment of the present disclosure.

Referring to FIG. 23, in operation 2305, the UE receives a resource assignment signal from the eNB through an UL grant or other control signal. In operation 2310, the UE determines whether a plurality of subframes have been allocated based on the received signal. If the plurality of subframes have been allocated, the UE determines a resource position of the plurality of subframes allocated based on the resource assignment signal and the other control signals in operation 2315. On the other hand, if the plurality of subframes have not been allocated, the UE identifies a resource position of a single subframe allocated based on a timing when the resource assignment signal is received or other control signals in operation 2325. Identification of the resource position may be performed by at least one of the above-described embodiments. In operation 2320, the UE transmits UL data to the eNB through the unlicensed band during subframe(s) allocated based on the received signal.

[Block ACK]

Depending on which one of a PCell and an SCell the UE is to use to transmit a channel measurement report with respect to an RS or to transmit an ACK/NACK feedback with respect to data transmission, there may be various cases as shown in Table 3.

TABLE 3

| | Channel Measurement Report | ACK/NACK Feedback |
|---|---|---|
| Case I-1 | PCell | PCell |
| Case I-2 | PCell | SCell |
| Case II-1 | SCell | PCell |
| Case II-2 | SCell | SCell |

If an LAA system is configured with an FDD mode, one frequency band may be set for one of a DL and an UL, such that in a general scenario, one shared band is basically set for the DL. In the FDD mode, another shared band to be set for the UL is needed, and thus operations for simultaneous radio resource access for at least two shared bands are required. That is, the UE has to operate in two or more shared bands. According to operations for a CA or hybrid network in the current LTE standards, it is not easy to support LBT for a plurality of shared bands. Thus, to avoid such complicated operations, the UE may perform radio resource access for an UL through an existing PCell.

If an LAA system is configured with a TDD mode, both a DL and an UL may be set in one frequency band and thus the UE may transmit a channel measurement report or an ACK/NACK feedback for a DL subframe in an UL subframe. However, since less UL subframes than DL subframes are set, UL transmission is delayed behind several subframes if the UE fails in obtaining a resource of an UL. Thus, the UE may leave an UL subframe empty or transmit a reservation signal after an LBT success before a predetermined time from the next DL subframe. As such, when an UL subframe is not used, the UE may perform UL transmission in a PCell.

To support resource allocation for a plurality of subframes (or frames), one of the two following feedback procedures may be used.

1) A UE having received a plural-frame resource assignment signal may transmit a feedback with respect to data reception of a separate resource.

2) A UE having received a plural-frame resource assignment signal may transmit a block feedback, that is, a block ACK, with respect to data reception of a plurality of resources.

The feedback has to not only indicate a success or failure in data reception, but also include information about an ACK/NACK in which resources (subframes or HARQ processes) among a plurality of resources, taking account of a case where transmission and reception are performed discontinuously according to whether the eNB succeeds or fails in resource occupancy. The eNB stores information about an LBT success or failure in the previous subframe, and determines whether an ACK/NACK reported by the UE corresponds to actual data transmission to properly control a retransmission operation with respect to the UE.

[Frequency Reuse]

In case of an FBE, synchronized eNBs may be capable of signal transmission using frequency reuse (i.e., reuse-1 specified in LTE). Reuse-1 of LTE means that all adjacent eNBs maximize spectrum efficiency by using identical frequency channels. A CCA period for performing LBT is configured in the same timing, such that the UE may receive a signal from a serving eNB in a timing when adjacent eNBs do not transmit a signal. Thus, if a frequency channel is empty due to LBT, eNBs simultaneously perform transmission in the frequency channel.

However, in case of an LBE, the eNBs use a randomly set back-off counter and thus perform LBT in different timings.

Hence, if a neighboring eNB is already sending a signal in a particular frequency channel, the eNB may not perform transmission and may be able to perform ECCA after the frequency channel becomes empty. Even if eNBs belonging to mobile network operators having an identical public land mobile network (PLMN) are synchronized with each other, it may not be possible to use reuse-1 if the above problem is not solved.

To this end, signals of eNBs may be configured such that a UE may distinguish among signals of eNBs belonging to the same mobile network operator. In an embodiment, an eNB succeeding in LBT may include a cell ID and a PLMN ID in a transmission signal. To include the cell ID and the PLMN ID in the transmission signal, the transmission signal from the eNB needs to include at least 67 µs (micro second) of orthogonal frequency division multiplexing (OFDM) or single carrier frequency division multiple access (SC-FDMA) symbols. Thus, even if the shortest possible signal is configured, a signal of an eNB is longer than a CCA period of a minimum of 20 µs.

To solve this problem, a transmitter (an eNB or a UE) stores a channel intensity value or a received power value, which is received for a CCA period, in a memory, and at the same time, attempts to receive signals from neighboring eNBs. If a signal from at least one neighboring eNB is received, the transmitter calculates a power value of the received signal, and removes a sum of power values received from at least one neighboring eNB from a received power value calculated with channel intensity values received during CCA periods, which are stored previously, or a previously stored received power value. In this way, the transmitter readjusts a backoff counter according to a received power value calculated as a result of LBT during a plurality of CCA periods. A sum of received power values from neighboring eNBs may be averaged during a predetermined time period. The averaged sum of received power values is used to adjust received power values calculated in subsequent CCA periods. Once the backoff counter becomes 0 by repeating such an operation, the transmitter may transmit a signal.

To achieve Reuse-1 without separating signals received from neighboring eNBs, control based on a network may be performed as described below.

A mobility management entity (MME) or a control server in an operator network sets a plurality of eNBs as one group. The eNB exchanges information with other eNBs in the same group through an MME or a control server or an X2 interface.

Hereinbelow, an embodiment for supporting frequency reuse in communication using an unlicensed band will be described.

1) An MME or a control server determines a value n of a backoff counter for a particular eNB group at random in a range of [0, N]. The value n of the backoff counter may also be determined by a representative eNB in an eNB group or a representative eNB in a plurality of eNB groups. The plurality of eNBs or the plurality of eNB groups may be located in the same site or different sites.

2) The MME or the control server notifies the value n of the backoff counter to other (k−1) eNBs in the same group. Such other eNBs determine to use the value n of the backoff counter for LBT. The value n of the backoff counter may also be set to other (k−1) eNBs by a representative eNB in an eNB group or eNB groups.

3) Each eNB performs LBT in an ECCA period based on the backoff counter, and reduces the backoff counter if the channel is empty (idle).

4) The eNB having recognized that the channel is occupied (busy) during the ECCA period stores the current backoff counter and freezes an LBT operation, and then reports freezing of LBT to an MME, a control server, or a representative eNB in eNB group(s). The report for the freezing of LBT may include the stored value of the backoff counter.

5-1) Among k eNBs forming an eNB group, an eNB determining all LBT results until the backoff counter becomes 0 to be idle performs DL transmission again and goes back to 1). An eNB having performed DL transmission reports to an MME, a control server, or a representative eNB in an eNB group that the eNB has performed DL transmission.

5-2) If all of the k eNBs report LBT freezing in an ECCA period, the MME, the control server, or the representative eNB in the eNB group indicates the smallest backoff counter value among backoff counter values reported from eNBs belonging to the eNB group to the k eNBs to readjust backoff counter values of the other eNBs to the smallest backoff counter value. Each eNB instructed to readjust the backoff counter value goes to 3) to resume LBT.

[Multi-UL Grant and Data Transmission Procedure]

Figure 24:
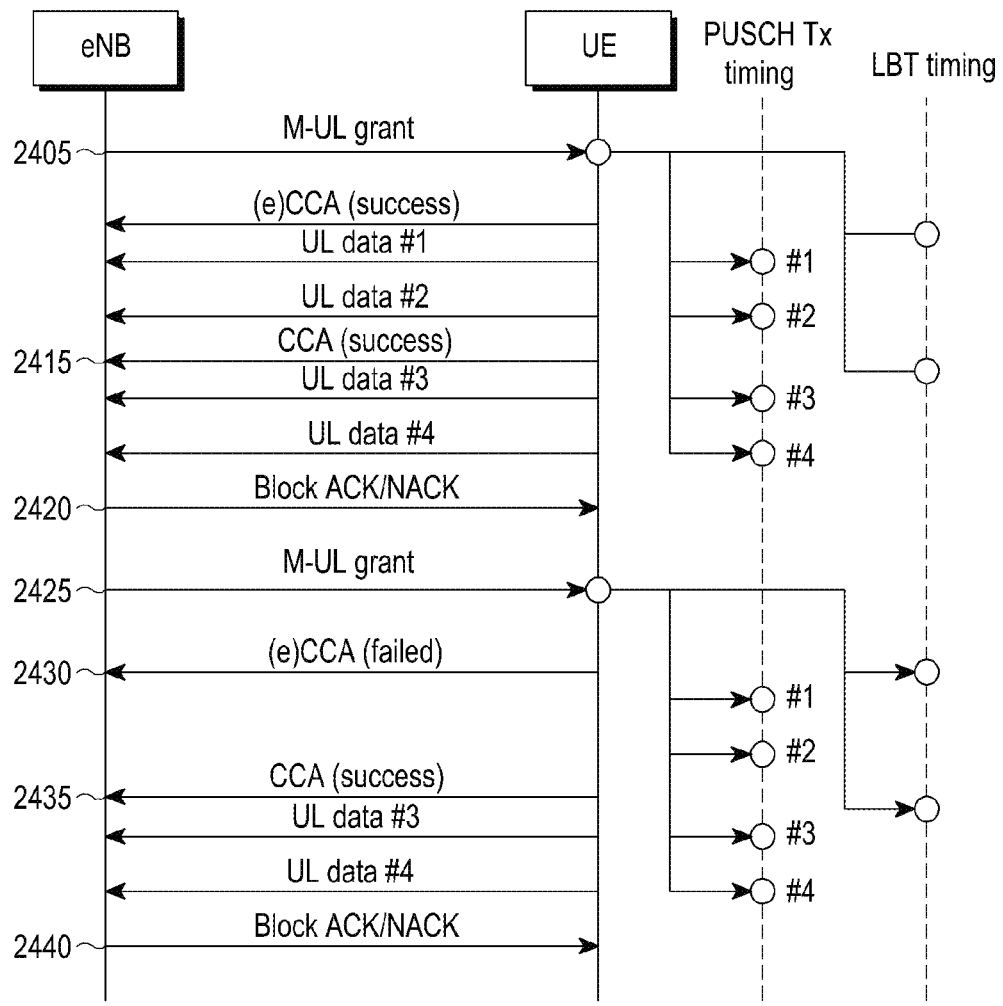
FIG. 24 is a flowchart illustrating a procedure for communicating a multiple UL (M-UL) grant and data according to an embodiment of the present disclosure.

FIG. 24 is a flowchart illustrating a procedure for communicating a multiple UL (M-UL) grant and data according to an embodiment of the present disclosure.

Referring to FIG. 24, in operation 2405, the eNB transmits an M-UL grants for allocating to the UE a plurality of UL subframes #1, #2, #3, and #4 communicable through an unlicensed band. A UE immediately before a UL subframe #1 performs and succeeds in LBT for a CCA or an ECCA 2410, and transmits UL data #1 and #2 during UL subframes #1 and #2. If a basic unit of plural-subframe scheduling is set to 2 subframes, then the UE performs LBT for CCA or ECCA 2415 again immediately before the UL subframe #3, and transmits UL data #3 and #4 during the UL subframes #3 and #4 if succeeding in LBT. In operation 2420, the eNB transmits a block ACK/NACK for the received UL data #1, #2, #3, and #4. The block ACK/NACK indicates a reception success/failure with respect to the UL data #1, #2, #3, and #4.

In operation 2425, the eNB transmits an M-UL grant for allocating to the UE a plurality of UL subframes #1, #2, #3, and #4 communicable through an unlicensed band. Immediately before the UL subframe #1, the UE attempts LBT for CCA or ECCA 2435, but fails in LBT. The UE then waits during the UL subframes #1 and #2 without performing transmission. If attempting LBT for the CCA or ECCA 2435 and succeeding in the LBT immediately before the UL subframe #3, then the UE transmits the UL data #3 and #4 during the UL subframes #3 and #4 and receives a block ACK/NACK 2440 from the eNB. Meanwhile, if an ACK/NACK is sent to a PCell rather than an SCell, an existing ACK/NACK feedback procedure is used.

Figure 25:
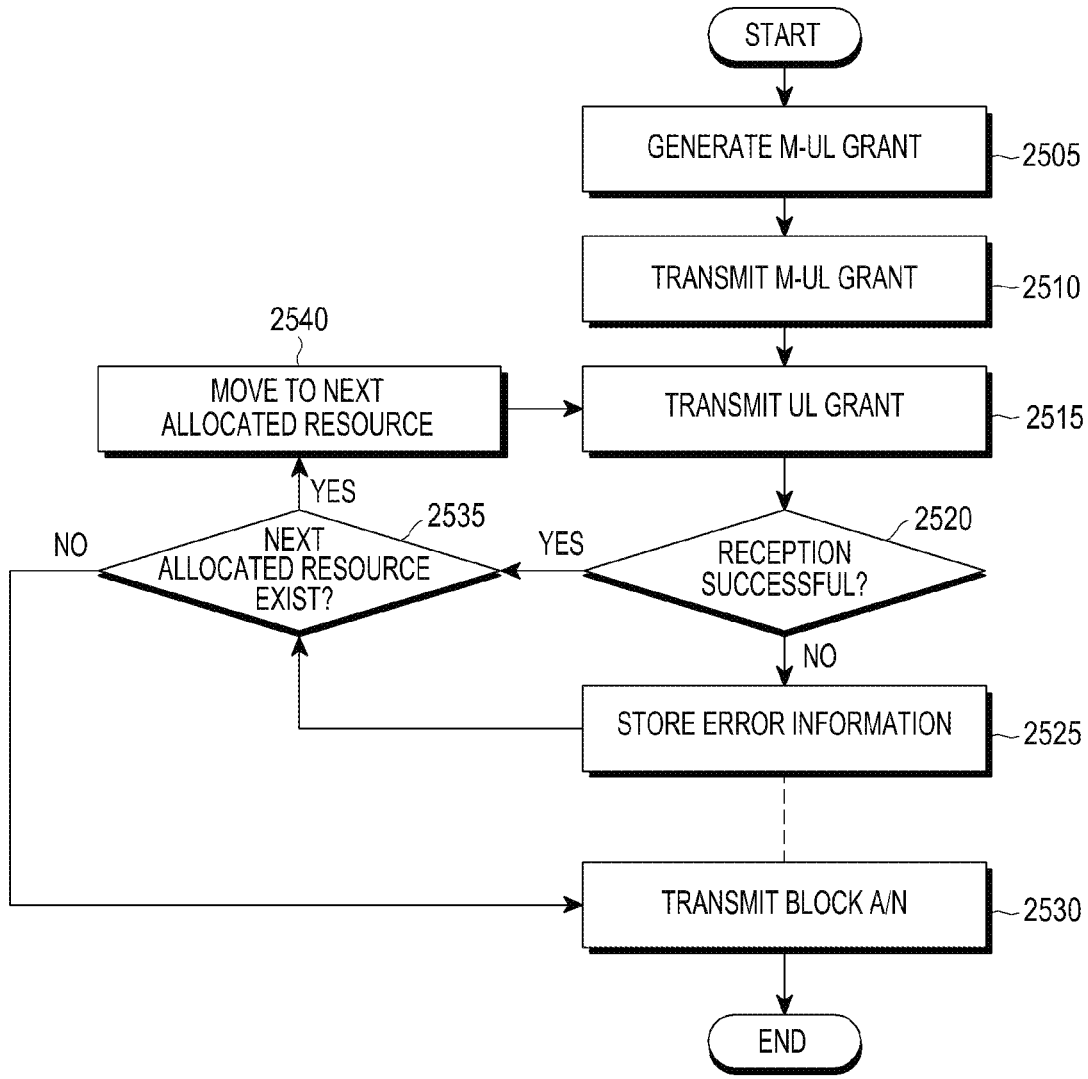
FIG. 25 is a flowchart illustrating operations of an eNB for transmitting a block acknowledgement (ACK)/negative ACK (HACK) according to an embodiment of the present disclosure.

FIG. 25 is a flowchart illustrating operations of an eNB for transmitting a block ACK/NACK according to an embodiment of the present disclosure.

Referring to FIG. 25, the eNB generates an M-UL grant for an UE in operation 2505, and transmits the M-UL grant in operation 2510. The eNB receives UL data in a resource position allocated by the M-UL grant in operation 2515, and determines whether the eNB succeeds in reception of the UL data in operation 2520. If having received the UL data successfully, the eNB stores existence or absence of an error of the UL data in operation 2525 and goes to operation 2530.

In operation 2530, the eNB transmits a block ACK/NACK indicating existence or absence of an error on a subframe basis to the UE.

Meanwhile, if having not received the UL data in operation 2520 or after storing information about existence or absence of an error in operation 2525, the eNB determines whether there are still allocated UL subframe(s) in operation 2535. If there are more allocated UL subframe(s), the eNB moves to the next allocated position in operation 2540 and goes to operation 2515.

Figure 26:
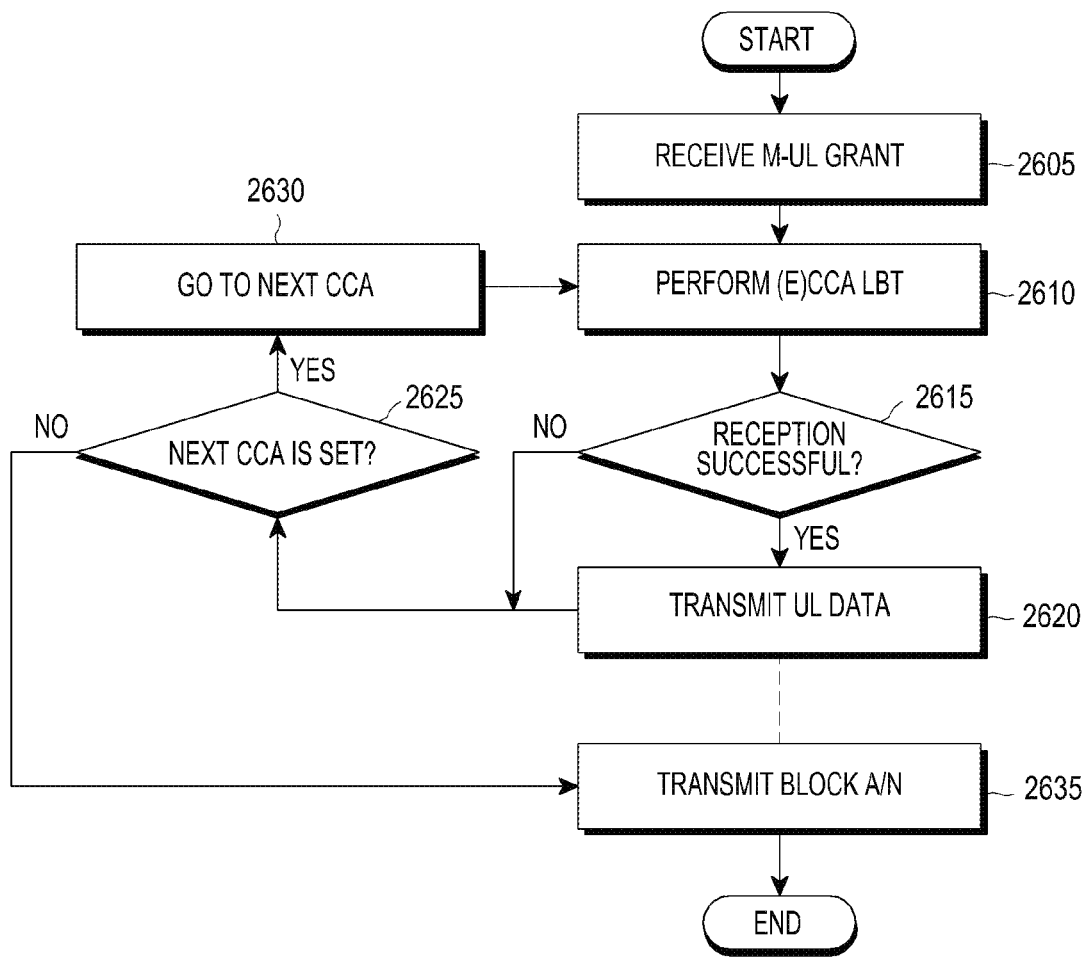
FIG. 26 is a flowchart illustrating operations of a UE for receiving a block ACK/NACK according to an embodiment of the present disclosure.

FIG. 26 is a flowchart illustrating operations of a UE for transmitting a block ACK/NACK according to an embodiment of the present disclosure.

Referring to FIG. 26, in operation 2605, the UE receives a M-UL grant and identifies allocated UL subframes by using the M-UL grant and if necessary, other control signals. The UE attempts LBT for CCA or ECCA immediately before an allocated UL subframe in operation 2610 and determines whether the UE succeeds in LBT in operation 2615. If succeeding in LBT, the UE transmits UL data during at least one subsequent UL subframe in operation 2620 and goes to operation 2625. On the other hand, if failing in LBT, the UE directly goes to operation 2625.

The UE determines whether next CCA is set in operation 2625, and if next CCA is not set, the UE goes to operation 2635 to receive a block ACK/NACK for the transmitted UL data. On the other hand, if next CCA is set, the UE moves to a period for the next CCA in operation 2630 and proceeds to operation 2610.

[Scheduling for Hidden Node]

Figure 27:
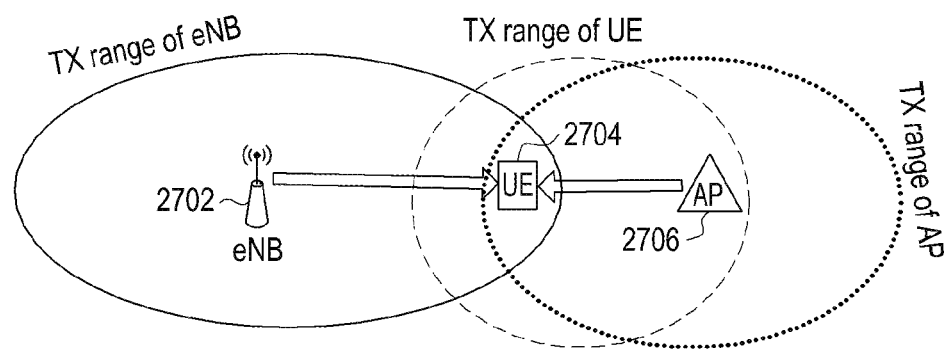
FIG. 27 is a view for describing a hidden node problem of a Wireless Fidelity (Wi-Fi) network according to an embodiment of the present disclosure.

FIG. 27 is a view for describing a hidden node problem of a Wi-Fi network according to an embodiment of the present disclosure.

Referring to FIG. 27, when a UE 2704 receives a signal from an eNB 2702, the UE 2704 may also receive a signal from a Wi-Fi AP 2706 in a position where the UE 2704 may not be able to sense a signal from the eNB 2702, and the signal from the AP 2706 acts as interference with a desired signal (i.e., a signal from a serving eNB). Since the eNB 2702 may operate as a hidden node to the AP 2706 in this way, such a problem will be referred to as the hidden node problem.

To alleviate the hidden node problem in channel measurement of the UE, the UE may consider whether the eNB occupies a resource during channel measurement.

Thus, the UE may perform channel measurement for three situations provided below. A channel measurement result may include a reference signal received power (RSRP) with respect to a signal of a serving eNB, a signal-to-interference and noise ratio (SINR) including a signal and interference of the serving eNB, a reference signal received quality (RSRQ), or a received signal strength indicator (RSSI).

1) When the eNB occupies a resource and the UE is allocated a resource, the UE performs channel measurement and measures all of a CRS-based RSRP, a DRS-based RSRP, an RSRQ, and an RSSI.

2) When the eNB occupies a resource, but the UE is not allocated a resource, the UE performs channel measurement and measures a CRS-based RSRP and an RSSI.

3) When the eNB does not occupy a resource and the UE is not allocated a resource, the UE performs channel measurement and measures an RSSI.

If a hidden node exists, in situations 1) and 2), an SINR is given by (signal power of serving eNB)/{(interference signal power of hidden node)+(noise power)}. For 3), there is no serving eNB signal, such that the UE may measure {(all signal power)+(noise power)}. The UE may distinguish RSSI_occupied measured at a timing when the eNB occupies a resource from RSSI_unoccupied measured at a timing when the eNB does not occupy a resource, calculates a difference RSSI_gap between RSSI_occupied and RSSI_unoccupied, and corrects a CQI value considering RSSI_gap when measuring an SINR in situations 1) and 2).

Figure 28:
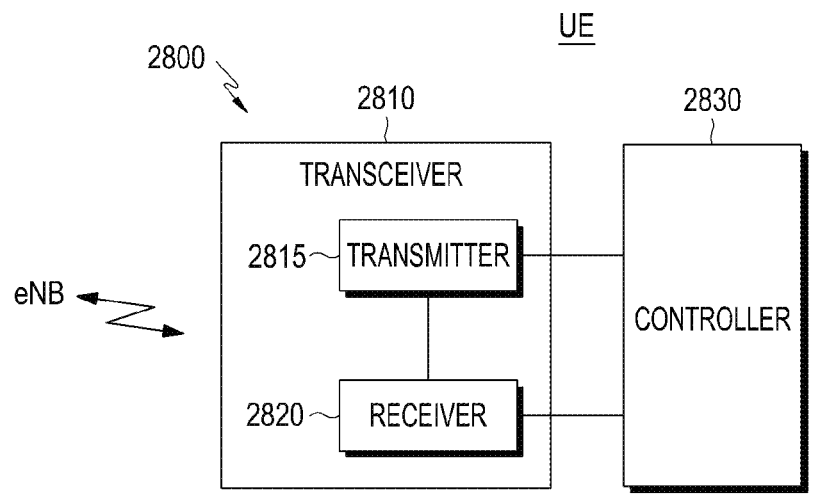
FIG. 28 is a block diagram of a UE according to an embodiment of the present disclosure.

FIG. 28 is a block diagram of a UE device according to an embodiment of the present disclosure.

Referring to FIG. 28, a UE 2800 may include a transceiver 2810 including a transmitter 2815 and a receiver 2820 for performing signal transmission and reception with another device, e.g., an eNB, and a controller 2830 for controlling operations of the UE 2800. In the present disclosure, embodiments for resource allocation of an unlicensed band may be interpreted as being carried out by the controller 2830. However, the controller 2830 and the transceiver 2810 should not be necessarily implemented as separate modules, and may be implemented as one component in the form of, for example, a single chip.

Figure 29:
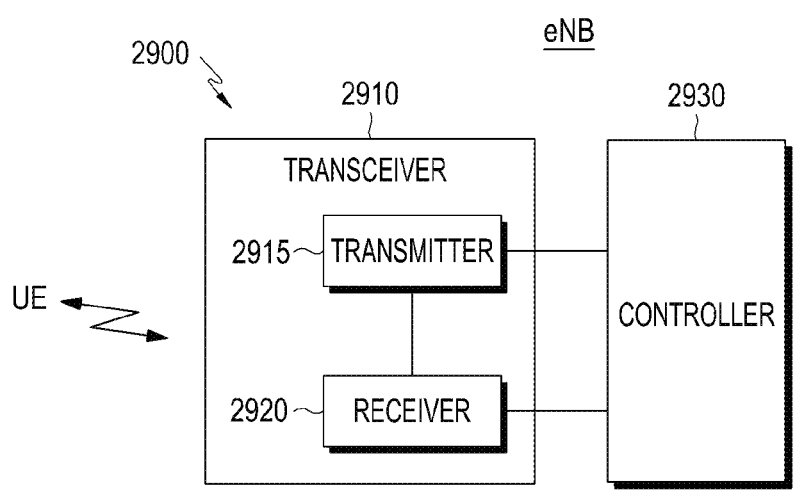
FIG. 29 is a block diagram of an eNB according to an embodiment of the present disclosure.

FIG. 29 is a block diagram of an eNB according to an embodiment of the present disclosure.

Referring to FIG. 29, an eNB 2900 may include a transceiver 2910 including a transmitter 2915 and a receiver 2920 for performing signal transmission and reception with another device, e.g., a UE or another eNB, and a controller 2930 for controlling operations of the UE 2900. In the present disclosure, embodiments for resource allocation of an unlicensed band may be interpreted as being carried out by the controller 2930. However, the controller 2930 and the transceiver 2910 should not be necessarily implemented as separate modules, and may be implemented as one component in the form of, for example, a single chip.

It should be noted that LAA control/data signal transmission schemes, an operating procedure of an LAA UE, a resource frame configuration, and structures of UE and eNB devices are not intended to limit the scope of the present disclosure. All elements or operations described with reference to FIGS. 1 through 26 should not be interpreted as an essential element for carrying out the present disclosure, and it may be implemented within a range that does not spoil the gist of the present disclosure even including some elements.

The above described operations of the BS or the UE may be implemented by including a memory device storing a corresponding program code in an element of a transmitter, a receiver, the BS, or the UE. That is, the controller of the BS or the UE carries out the above described operations by reading and executing the program code stored in the memory device by means of a processor or a Central Processing Unit (CPU).

As described herein, various components or modules in the entity, eNB, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. For example, various electric configurations and methods may be carried out by using electric circuits such as transistors, logic gates, and an application specific integrated circuit (ASIC).

While embodiments of the present disclosure have been described, various changes may be made without departing the scope of the present disclosure. Therefore, the scope of the present disclosure should be defined by the appended claims and equivalents thereof, rather than by the described embodiments.

What is claimed is:

1. A method for allocating resources for an unlicensed band by a base station in a cellular network, the method comprising:

transmitting, to a user equipment (UE), in a downlink subframe, downlink control information for scheduling uplink data transmission in each of a plurality of scheduled uplink subframes in the unlicensed band, the downlink control information comprising a field indicating a hybrid automatic request repeat (HARQ) process identifier (ID) of a first scheduled uplink subframe from among the plurality of scheduled uplink subframes;

identifying a first HARQ process ID indicated by the field and at least one second HARQ process ID for other scheduled subframe, the at least one second HARQ process ID based on the first HARQ process ID; and receiving, from the UE, uplink data according to the identified HARQ process IDs on the scheduled uplink subframes in the unlicensed band.

2. The method of claim 1, wherein the downlink control information comprises:

a first field indicating a number of the plurality of scheduled uplink subframes, the scheduled uplink subframes being consecutive;

a second field indicating at least one resource block in the scheduled uplink subframes; and a modulation and coding scheme for the uplink data in the scheduled uplink subframes.

3. The method of claim 2, further comprising:

transmitting a higher layer signaling message comprising information related to a starting position of the scheduled uplink subframes; and identifying the scheduled uplink subframes based on the starting position and the first field in the downlink control information.

4. The method of claim 1, wherein the downlink control information further comprises a timing offset between the downlink subframe and the first scheduled uplink subframe.

5. The method of claim 1, further comprising:

transmitting, to the UE, in a first downlink subframe, first downlink control information for scheduling uplink data transmission in a single uplink subframe in the unlicensed band; and receiving, from the UE, in the unlicensed band, uplink data on the single uplink subframe identified based on the first downlink control information and a position of the first downlink subframe, wherein the first downlink control information comprises:

a timing offset between the first downlink subframe and the single uplink subframe, a field indicating at least one resource block in the single uplink subframe, a modulation and coding scheme for the single uplink subframe, and a HARQ process ID of the single uplink subframe.

6. A method for receiving resource allocation for an unlicensed band by a user equipment (UE) in a cellular network, the method comprising:

receiving, from a base station, in a downlink subframe, downlink control information for scheduling uplink data transmission in each of a plurality of scheduled uplink subframes in the unlicensed band, the downlink control information comprising a field indicating a hybrid automatic request repeat (HARQ) process identifier (ID) of a first scheduled uplink subframe from among the plurality of scheduled uplink subframes;

identifying a first HARQ process ID indicated by the field and at least one second HARQ process ID for other scheduled subframe, the at least one second HARQ process ID based on the first HARQ process ID; and transmitting, to the base station, uplink data according to the identified HARQ process IDs on the scheduled uplink subframes in the unlicensed band.

7. The method of claim 6, wherein the downlink control information comprises:

a first field indicating a number of the plurality of scheduled uplink subframes, the scheduled uplink subframes being consecutive;

a second field indicating at least one resource block in the scheduled uplink subframes; and a modulation and coding scheme for the uplink data in the scheduled uplink subframes.

8. The method of claim 7, further comprising:

receiving, from the base station, a higher layer signaling message comprising information related to a starting position of the scheduled uplink subframes; and identifying the scheduled uplink subframes based on the starting position and the first field in the downlink control information.

9. The method of claim 6, wherein the downlink control information further comprises a timing offset between the downlink subframe and the first scheduled uplink subframe.

10. The method of claim 6, further comprising:

receiving, from the base station, in a first downlink subframe, first downlink control information for scheduling uplink data transmission in a single uplink subframe in the unlicensed band and transmitting, to the base station, in the unlicensed band, uplink data on the single uplink subframe identified based on the first downlink control information and a position of the first downlink subframe, wherein the first downlink control information comprises:

a timing offset between the first downlink subframe and the single uplink subframe, a field indicating at least one resource block in the single uplink subframe, a modulation and coding scheme for the single uplink subframe, and a HARQ process ID of the single uplink subframe.

11. A base station for allocating resources for an unlicensed band in a cellular network, the base station comprising:

a transceiver configured to:

transmit, to a user equipment (UE), in a downlink subframe, downlink control information for scheduling uplink data transmission in each of a plurality of scheduled uplink subframes in the unlicensed band, the downlink control information comprising a field indicating a hybrid automatic request repeat (HARQ) process identifier (ID) of a first scheduled uplink subframe from among the plurality of scheduled uplink subframes, and receive, from the UE, uplink data according to HARQ process IDs on the scheduled uplink subframes in the unlicensed band; and a controller configured to identify the HARQ process IDs comprising a first HARQ process ID being indicated by the field and at least one second HARQ process ID for other scheduled subframe, the at least one second HARQ ID based on the first HARQ process ID.

12. The base station of claim 11, wherein the downlink control information further comprises a timing offset between the downlink subframe and the first scheduled uplink subframe.

13. The base station of claim 11, wherein the downlink control information comprises:
a first field indicating a number of the plurality of scheduled uplink subframes, the scheduled uplink subframes being consecutive;
a second field indicating at least one resource block in the scheduled uplink subframes; and
a modulation and coding scheme for the uplink data in the scheduled uplink subframes.

14. The base station of claim 13, wherein
the transceiver is further configured to transmit a higher layer signaling message comprising information related to a starting position of the scheduled uplink subframes; and
the controller is further configured to identify the scheduled uplink subframes based on the starting position and the first field in the downlink control information.

15. The base station of claim 13, wherein the transceiver is further configured to:
transmit, to the UE, in a first downlink subframe, first downlink control information for scheduling uplink data transmission in a single uplink subframe in the unlicensed band; and
receive, from the UE, in the unlicensed band, uplink data on the single uplink subframe identified based on the first downlink control information and a position of the first downlink subframe,
wherein the first downlink control information comprises:
a timing offset between the first downlink subframe and the single uplink subframe,
a field indicating at least one resource block in the single uplink subframe,
a modulation and coding scheme for the single uplink subframe, and
a HARQ process ID of the single uplink subframe.

16. A user equipment (UE) for receiving resource allocation for an unlicensed band in a cellular network, the UE comprising:
a transceiver configured to:
receive, from a base station, in a downlink subframe, downlink control information for scheduling uplink data transmission in each of a plurality of scheduled uplink subframes in the unlicensed band, the downlink control information comprising a field indicating a hybrid automatic request repeat (HARQ) process identifier (ID) of a first scheduled uplink subframe from among the plurality of scheduled uplink subframes, and
transmit, to the base station, uplink data according to HARQ process IDs on the scheduled uplink subframes in the unlicensed band; and
a controller configured to identify the HARQ process IDs comprising a first HARQ process ID indicated by the field and at least one second HARQ process ID for other scheduled subframe, the at least one second HARQ process ID based on the first HARQ process ID.

17. The UE of claim 16, wherein the downlink control information comprises:
a first field indicating a number of the plurality of scheduled uplink subframes, the scheduled uplink subframes being consecutive;
a second field indicating at least one resource block in the scheduled uplink subframes; and
a modulation and coding scheme for the uplink data in the scheduled uplink subframes.

18. The UE of claim 17, wherein
the transceiver is further configured to receive, from the base station, a higher layer signaling message comprising information related to a starting position of the scheduled uplink subframes; and
the controller is further configured to identify the scheduled uplink subframes based on the starting position and the first field in the downlink control information.

19. The UE of claim 16, wherein the downlink control information further comprises a timing offset between the downlink subframe and the first scheduled uplink subframe.

20. The UE of claim 16, wherein the transceiver is further configured to:
receive, from the base station, in a first downlink subframe, first downlink control information for scheduling uplink data transmission in for a single uplink subframe in the unlicensed band; and
transmit, to the base station, in the unlicensed band, uplink data on the single uplink subframe identified based on the first downlink control information and a position of the first downlink subframe,
wherein the first downlink control information comprises:
a timing offset between the first downlink subframe and the single uplink subframe,
a field indicating at least one resource block in the single uplink subframe,
a modulation and coding scheme for the single uplink subframe, and
a HARQ process ID of the single uplink subframe.

* * * * *